(12) United States Patent
Mitchell et al.

(10) Patent No.: US 11,767,940 B2
(45) Date of Patent: *Sep. 26, 2023

(54) COUPLING GASKET AND BAR LINKAGE FOR FRICTION-FIT RANGE REDUCER

(71) Applicant: Mueller International, LLC, Atlanta, GA (US)

(72) Inventors: Timothy J. Mitchell, Hixson, TN (US); Steve Kent Fearnow, Soddy-Daisy, TN (US); Jason White Bradley, Soddy-Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/097,967

(22) Filed: Nov. 13, 2020

(65) Prior Publication Data

US 2021/0062945 A1     Mar. 4, 2021

Related U.S. Application Data

(63) Continuation of application No. 15/908,137, filed on Feb. 28, 2018, now Pat. No. 10,871,248.

(51) Int. Cl.
*F16L 21/06* (2006.01)
*F16L 21/03* (2006.01)
*F16L 25/14* (2006.01)

(52) U.S. Cl.
CPC ............. *F16L 21/065* (2013.01); *F16L 21/03* (2013.01); *F16L 25/14* (2013.01)

(58) Field of Classification Search
CPC ......... F16L 21/02; F16L 21/022; F16L 21/03; F16L 21/065; F16L 17/06; F16L 17/02;

(Continued)

(56) References Cited

U.S. PATENT DOCUMENTS 703,657 A    7/1902   Horn
1,891,874 A  12/1932  Elkins
(Continued)

FOREIGN PATENT DOCUMENTS

DE    19810206    5/1999

OTHER PUBLICATIONS

Krausz USA; Brochure entitled: "Hymax by Krausz Wide-Rage Coupling Solutions", publicly available prior to Jul. 13, 2017, 12 pgs.

(Continued)

*Primary Examiner* — Aaron M Dunwoody
(74) *Attorney, Agent, or Firm* — Taylor English Duma LLP

(57) ABSTRACT

A seal for a pipe coupling can include an outer gasket defining a radially inner surface defining a plurality of grooves; and an inner gasket separably joined to the outer gasket and defining a radially outer surface, the radially outer surface defining a plurality of ridges extending radially outward and including: a first ridge, each of first and second side surfaces of the first ridge angled in cross-section with respect to a radial direction of the inner gasket towards a first axial end of the inner gasket when in an uncompressed state; and a second ridge, each of first and second side surfaces of the second ridge angled in cross-section with respect to the radial direction towards a second axial end of the inner gasket when in the uncompressed state; wherein the radially outer surfaces of the inner and outer gaskets contact each other.

25 Claims, 11 Drawing Sheets

(58) Field of Classification Search
CPC ....... F16L 17/035; F16L 25/065; F16L 25/04; F16L 25/14; F16J 15/104; F16J 15/022; F16J 15/02; F16J 15/021; F16J 15/10; F16J 15/102

See application file for complete search history.

(56) References Cited

U.S. PATENT DOCUMENTS

| | | | |
|---|---|---|---|
| 2,980,143 A | 4/1961 | Harris | |
| 3,135,519 A * | 6/1964 | Ligon | F16L 21/03 277/944 |
| 3,150,876 A * | 9/1964 | Lafferty | F16L 21/05 277/603 |
| 3,582,095 A * | 6/1971 | Bogaert | F16J 15/104 428/161 |
| 4,487,421 A | 12/1984 | Housas et al. | |
| 4,492,391 A | 1/1985 | Haines | |
| 5,082,313 A | 1/1992 | Bryant et al. | |
| 5,203,594 A * | 4/1993 | Straub | G02B 6/4444 285/112 |
| 5,507,533 A | 4/1996 | Mumma | |
| 5,941,576 A | 8/1999 | Krausz | |
| 6,139,068 A | 10/2000 | Burress et al. | |
| 6,293,556 B1 | 9/2001 | Krausz | |
| 7,243,955 B2 | 7/2007 | Krausz et al. | |
| 7,571,940 B2 * | 8/2009 | Krausz | F16L 21/065 285/373 |
| 7,997,626 B2 * | 8/2011 | Krausz | F16L 21/022 285/369 |
| 8,448,993 B2 | 5/2013 | Cumic et al. | |
| 8,528,945 B2 | 9/2013 | Bird et al. | |
| 8,776,351 B2 * | 7/2014 | Bird | F16L 21/065 285/369 |
| 8,789,832 B2 | 7/2014 | Gabert | |
| 8,864,181 B2 | 10/2014 | Bird et al. | |
| 9,310,002 B2 | 4/2016 | Chiproot et al. | |
| 9,791,077 B2 * | 10/2017 | Bird | F16L 23/006 |
| 9,909,697 B2 * | 3/2018 | Webb | F16L 21/08 |
| 10,844,983 B2 | 11/2020 | Mitchell | |
| 10,871,248 B2 | 12/2020 | Mitchell et al. | |
| 2003/0127858 A1 | 7/2003 | Chiproot et al. | |
| 2006/0061090 A1 * | 3/2006 | Krausz | F16L 25/14 285/110 |
| 2006/0138776 A1 * | 6/2006 | Amedure | F01N 13/1811 285/419 |
| 2007/0273151 A1 * | 11/2007 | Krausz | F16L 21/022 285/406 |
| 2008/0224464 A1 * | 9/2008 | Krausz | F16L 25/12 285/31 |
| 2009/0140520 A1 * | 6/2009 | Krausz | F16L 21/065 285/340 |
| 2011/0031737 A1 * | 2/2011 | Krausz | F16L 21/022 285/15 |
| 2011/0266754 A1 * | 11/2011 | Krausz | F16L 21/005 277/605 |
| 2012/0205909 A1 * | 8/2012 | Bird | F16L 21/08 285/337 |
| 2012/0299293 A1 * | 11/2012 | Chiproot | F16L 25/14 285/337 |
| 2013/0193685 A1 * | 8/2013 | Bird | F16L 25/14 285/337 |
| 2013/0331022 A1 | 12/2013 | Sandman et al. | |
| 2014/0001709 A1 * | 1/2014 | Chiproot | F16L 17/10 277/627 |
| 2014/0319781 A1 | 10/2014 | Chiproot | |
| 2015/0021910 A1 | 1/2015 | Bird et al. | |
| 2017/0051854 A1 | 2/2017 | Bird | |
| 2017/0059070 A1 * | 3/2017 | Chiproot | F16L 21/022 |
| 2018/0172196 A1 * | 6/2018 | Chiproot | F16L 21/065 |
| 2018/0347729 A1 * | 12/2018 | Chiproot | F16L 21/06 |
| 2019/0017637 A1 * | 1/2019 | Mitchell | F16L 21/06 |
| 2019/0162341 A1 | 5/2019 | Chiproot | |
| 2019/0264845 A1 * | 8/2019 | Mitchell | F16L 21/065 |
| 2020/0141523 A1 * | 5/2020 | Mitchell | F16B 2/065 |

OTHER PUBLICATIONS

Mitchell, Timothy J.; Corrected Notice of Allowance for U.S. Appl. No. 15/649,015, filed Jul. 13, 2017, dated Oct. 23, 2020, 6 pgs.
Mitchell, Timothy J.; Non-Final Office Action for U.S. Appl. No. 15/649,015, filed Jul. 13, 2017, dated May 28, 2020, 13 pgs.
Mitchell, Timothy J.; Notice of Allowance for U.S. Appl. No. 15/649,015, filed Jul. 13, 2017, dated Aug. 14, 2020, 11 pgs.
Mitchell, Timothy J.; Requirement for Restriction/Election for U.S. Appl. No. 15/649,015, filed Jul. 13, 2017, dated May 6, 2020, 8 pgs.
Hymax; Installation Instructions for Hymax and Hymax Long Body Coupling, publicly available prior to Feb. 28, 2018, 3 pgs.
Hymax; Installation Instructions for Hymax Coupling, publicly available prior to Feb. 28, 2018, 1 pg.
Hymax; Installation Instructions for Hymax Large and X-Large Coupling and Long Body, publicly available prior to Feb. 28, 2018, 3 pgs.
Hymax; Product Specifications for Hymax Coupling, publicly available prior to Feb. 28, 2018, 4 pgs.
Mitchell, Timothy J.; Applicant-Initiated Interview Summary for U.S. Appl. No. 15/908,137, filed Feb. 28, 2018, dated Jul. 15, 2020, 3 pgs.
Mitchell, Timothy J.; Corrected Notice of Allowance for U.S. Appl. No. 15/908,137, filed Feb. 28, 2018, dated Nov. 23, 2020, 6 pgs.
Mitchell, Timothy J.; Non-Final Office Action for U.S. Appl. No. 15/908,137, filed Feb. 28, 2018, dated May 8, 2020, 19 pgs.
Mitchell, Timothy J.; Notice of Allowance for U.S. Appl. No. 15/908,137, filed Feb. 28, 2018, dated Aug. 26, 2020, 10 pgs.
Mueller; Brochure for "Maxi-Range Pipe Couplings", Copyright 2008, 2 pgs.
Romac Industries, Inc.; Brochure for "Alpha Restrained Joint", published Dec. 7, 2016, 12 pgs.
Romac Industries, Inc.; Catalog for "Two-Bolt Wide Range Ductile Iron Coupling", published Jul. 1, 2017, 3 pgs.
Krausz Industries Ltd.; Installation instructions for "Hymax Grip Reducer", Nov. 9, 2016, 3 pgs.

* cited by examiner

COUPLING GASKET AND BAR LINKAGE FOR FRICTION-FIT RANGE REDUCER

REFERENCE TO RELATED APPLICATIONS

This application is a continuation of U.S. application Ser. No. 15/908,137, filed Feb. 28, 2018, which is hereby specifically incorporated by reference herein in its entirety.

TECHNICAL FIELD

Field of Use

This disclosure relates to pipe couplings. More specifically, this disclosure relates to a pipe couplings for use with a wide range of pipe diameters.

Related Art

Pipe couplings are commonly used to connect two pipe lengths together to form a pipe connection assembly, such as when installing a pipe system or pipe infrastructure. Many pipe couplings and seals of the pipe couplings, however, can only accommodate a narrow range of pipe sizes. For example, a pipe coupling or seal manufactured to American Society of Mechanical Engineers (ASME) standards may not be compatible with a pipe length manufactured to Japanese Industrial Standards (JIS). A 6" nominal pipe length manufactured to JIS can define an outside diameter of 165.2 mm while a 6" nominal pipe length manufactured to ASME standards can define an outside diameter of 168.3 mm. Many common pipe couplings and seals cannot tolerate the range of outside diameters between standards, nominal pipe sizes, excessive manufacturing tolerance, or ovality of the pipe lengths without developing leaks or failing to seal. As a result, a manufacturer, distributor, and user of such pipe couplings typically must fabricate or have available a different seal or even pipe coupling for each size pipe or pipe element that may be encountered.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pipe coupling comprising: a coupling body defining a first body end and a second body end distal from the first body end, a coupling bore defined by and extending through the coupling body from the first body end to the second body end; an end ring attached to the coupling body proximate to the first body end, the end ring comprising: a split ring defining a first ring end, a second ring end, and a radially inner surface; and a seal disposed within the split ring, the split ring configured to compress the seal radially inward in a compressed state of the pipe coupling, the seal comprising: an outer gasket defining a radially outer surface and a radially inner surface, the radially inner surface of the outer gasket defining a plurality of grooves, each of a first side surface and a second side surface of a one of the plurality of grooves angled in cross-section with respect to a radial direction of the seal towards a first axial end of the seal when the outer gasket is in an uncompressed state; and an inner gasket separably joined to the outer gasket, the inner gasket defining a radially outer surface, the radially outer surface of the inner gasket defining a plurality of ridges engaged with the plurality of grooves of the outer gasket, each of a first side surface and a second side surface of a first ridge of the plurality of ridges angled in cross-section with respect to a radial direction of the inner gasket towards the first axial end of the seal when the inner gasket is in an uncompressed state, the radially outer surface of the inner gasket contacting the radially inner surface of the outer gasket; and a fastener configured to draw the first ring end of the split ring towards the second ring end of the split ring.

In a further aspect, disclosed is a seal for a pipe coupling, the seal comprising: an outer gasket defining a radially inner surface, the radially inner surface defining a plurality of grooves; and an inner gasket separably joined to the outer gasket, the inner gasket defining a radially outer surface, the radially outer surface defining a plurality of ridges, each of the plurality of ridges extending radially outward relative to an axis of the inner gasket, the plurality of ridges comprising: a first ridge, each of a first side surface and a second side surface of the first ridge angled in cross-section with respect to a radial direction of the inner gasket towards a first axial end of the inner gasket when the inner gasket is in an uncompressed state; and a second ridge, each of a first side surface and a second side surface of the second ridge angled in cross-section with respect to a radial direction of the inner gasket towards a second axial end of the inner gasket when the inner gasket is in the uncompressed state; wherein the radially outer surface of the inner gasket contacts the radially inner surface of the outer gasket.

In yet another aspect, disclosed is a bar linkage for a pipe coupling, the bar linkage comprising: a first bar configured to be oriented parallel to an axis of the pipe coupling and span two end rings thereof; a second bar configured to be oriented parallel to an axis of the pipe coupling and span the two end rings thereof; and a tensioner joining the first bar to the second bar and configured to draw the first bar towards the second bar; each of the first bar and the second bar intersecting an axis of the tensioner.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
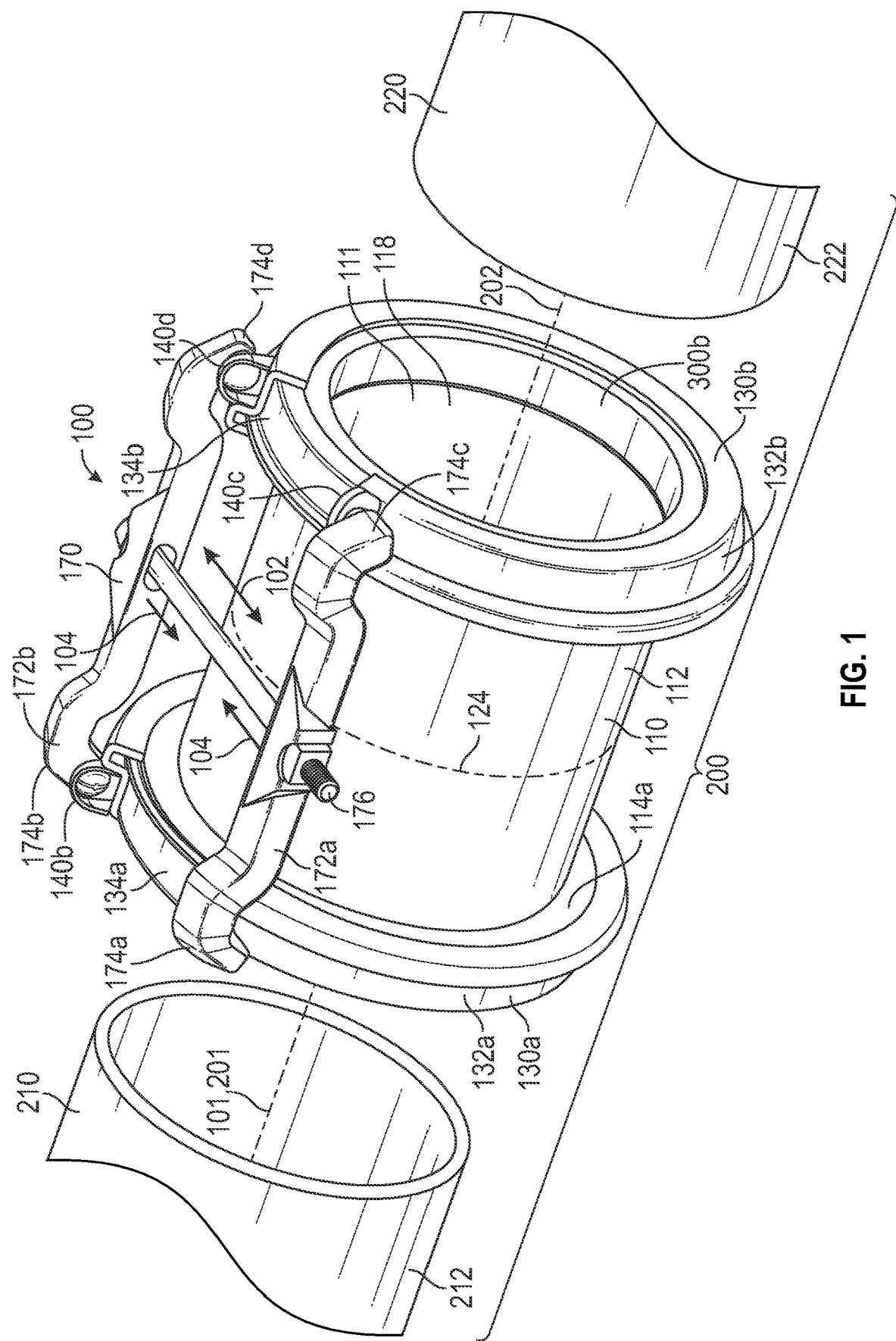
FIG. 1 is a perspective front view of a pipe connection assembly comprising a pipe coupling being assembled to a first pipe and a second pipe, the pipe coupling comprising a coupling body, a first end ring, a second end ring, and a bar linkage in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a pipe coupling and associated methods, systems, devices, and various apparatuses are disclosed herein. In one aspect, the top bar coupling can comprise a coupling body, a first end ring, a second end ring, and a bar linkage. It would be understood by one of skill in the art that the disclosed top bar coupling is described in but a few exemplary embodiments among many. No particular terminology or description should be considered limiting on the disclosure or the scope of any claims issuing therefrom.

FIG. 1 shows a perspective front view of a pipe connection assembly 200 in accordance with one aspect of the present disclosure. The pipe connection assembly 200 can comprise a pipe coupling 100, a first pipe element 210 defining a pipe axis 201, and a second pipe element 220 defining a pipe axis 202. The pipe coupling 100 can comprise a coupling body 110, a first end ring 130a, a second end ring 130b, and a bar linkage 170. The pipe coupling 100 can be a top-bar pipe coupling. In one aspect, as shown, each of the pipe elements 210, 220 can comprise a pipe. In other aspects, either pipe element 210, 220 can comprise any other pipe component connectable to the pipe coupling 100 such as, for example and without limitation, a fitting, an adapter, an extension, or an elbow.

The coupling body 110 can define an inner body surface 111 and an outer body surface 112. The coupling body 110 can define a first body end 115a (shown in FIG. 2) and a second body end 115b (shown in FIG. 2). The second body end 115b can be disposed opposite and distal from the first body end 115a. The inner body surface 111 can define a coupling bore 118 extending through the coupling body 110 from the first body end 115a to the second body end 115b. The coupling bore 118 can define a first bore opening 116a (shown in FIG. 4) at the first body end 115a and a second bore opening 116b (shown in FIG. 2) at the second body end 115b.

The first pipe element 210 can define a first outer pipe surface 212. The second pipe element 220 can define a second outer pipe surface 222. The first pipe element 210 can be inserted into the coupling body 110 through the first body end 115a, and the second pipe element 220 can be inserted into the coupling body 110 through the second body end 115b.

In some aspects, the coupling body 110 can define a substantially tubular shape, and the coupling bore 118 can define an axis 101. More specifically, in some aspects, an inner diameter of the coupling bore 118 can be constant from the first body end 115a to the second body end 115b. In other aspects, the coupling bore 118 can vary from the first body end 115a to the second body end 115b. For example and without limitation, the diameter of the coupling bore 118 can be greater between the first body end 115a and the second body end 115b compared to the diameter at the first body end 115a or the second body end 115b. More specifically, each of a first axial portion and the second axial portion of the coupling body 110 can define a frustoconical shape which can taper from a centerline 124 of the coupling body 110 towards the first body end 115a and the second body end 115b, respectively. The coupling body 110 can define a first flange 114a disposed at the first body end 115a, and a second flange 114b (shown in FIG. 2) disposed at the second body end 115b. Each of the flanges 114a,b can extend radially outward from the coupling body 110.

The first end ring 130a can be coupled to the coupling body 110 at the first body end 115a, and the second end ring 130b can be coupled to the coupling body 110 at the second body end 115b. Each end ring 130a,b can respectively comprise a split ring 132a,b, a seal 300a,b (seal 300a shown in FIG. 2) disposed within the respective split ring 132a,b, a bridge piece 134a,b, and a pair of end ring joints 140a,b, 140c,d (140a shown in FIG. 2). In some aspects, as shown, the split rings 132a,b can receive the respective flanges 114a,b of the coupling body 110 when the end rings 130a,b are coupled to the respective body ends 115a,b.

The bar linkage 170 can comprise a first bar 172a, a second bar 172b, and a tensioner 176. The tensioner 176 can attach the first bar 172a to the second bar 172b. The first bar 172a can define a first bar end 174a and a second bar end 174c disposed opposite from the first bar end 174a. The second bar 172b can define a first bar end 174b and a second bar end 174d disposed opposite from the first bar end 174b.

The tensioner 176 can attach to the first bar 172a at a point defined between the first bar end 174a and the second bar end 174c. The tensioner 176 can attach to the second bar 172b at a point defined between the first bar end 174b and the second bar end 174d. In some aspects, as shown, the tensioner 176 can be disposed between the first end ring 130a and the second end ring 130b, and the tensioner 176 can substantially align with the centerline 124 of the coupling body 110. In some aspects, as shown, the first bar 172a, the second bar 172b, and the tensioner 176 can substantially define an H-shape with the bars 172a,b forming the sides of the "H" and the tensioner 176 forming the cross-bar of the "H".

Each of the bars 172a,b can extend from the first split ring 132a at the first body end 115a to the second split ring 132b at the second body end 115b. The first bar end 174a of the first bar 172a can engage the first end ring joint 140a of the first split ring 132a, and the second bar end 174c can engage the first end ring joint 140c of the second split ring 132b. The first bar end 174b of the second bar 172b can engage the second end ring joint 140b of the first split ring 132a, and the second bar end 174d can engage the second end ring joint 140d of the second split ring 132b.

Figure 2:
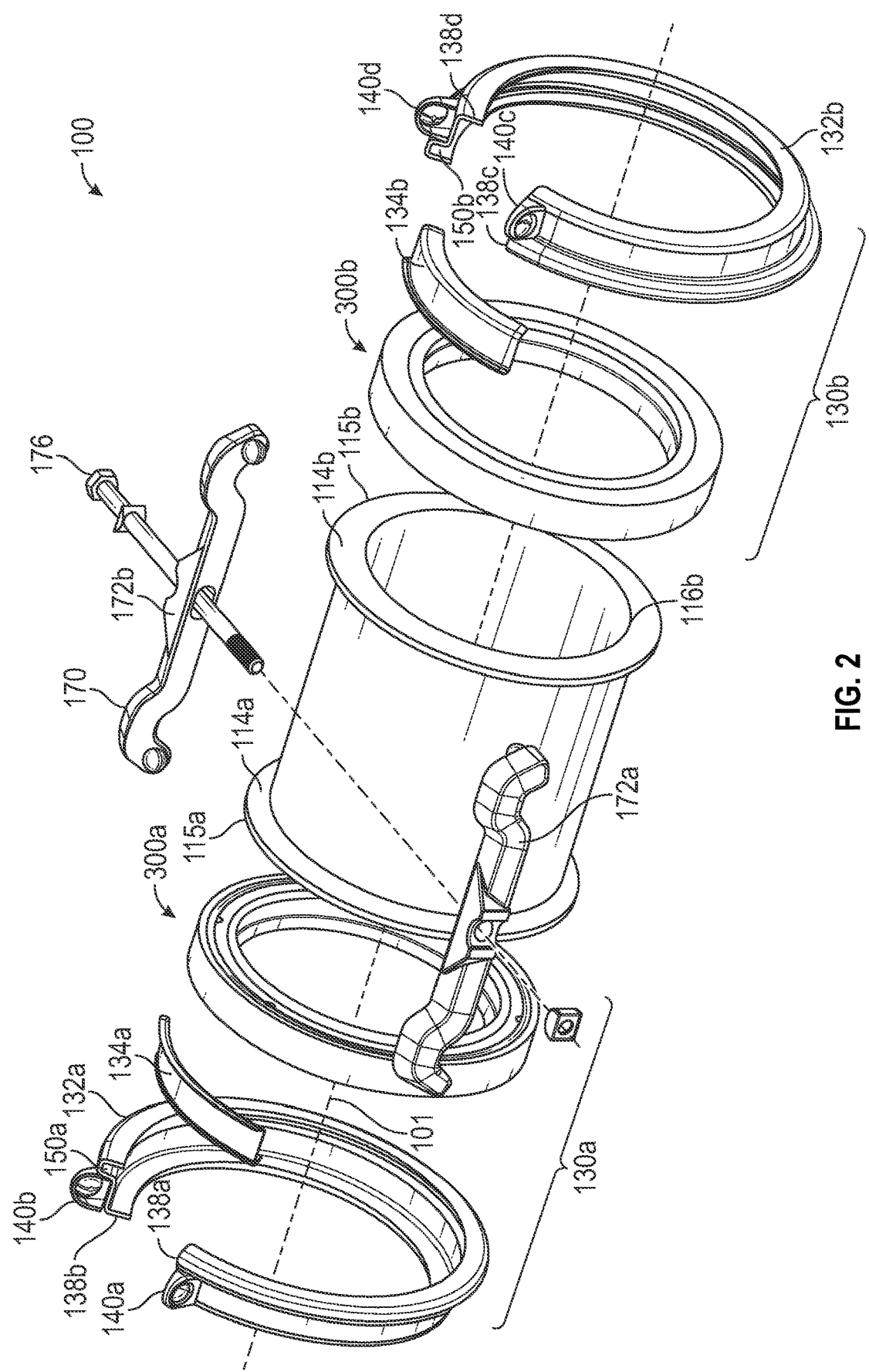
FIG. 2 is an exploded front perspective view of the pipe coupling of FIG. 1.

As shown in FIG. 2, the first split ring 132a can be shaped as a major arc extending about the axis 101, and the first split ring 132a can encircle a majority of a circumference of the first body end 115a. The first split ring 132a can define a first ring end 138a and a second ring end 138b. The first bridge piece 134a can circumferentially overlap the first ring end 138a and the second ring end 138b and extend across the distance from the first ring end 138a to the second ring end 138b. The first split ring 132a and the first bridge piece 134a can together completely encircle the circumference of the first body end 115a. A first end ring joint 140a of the end ring joints 140a,b,c,d can be secured to or formed with the first ring end 138a, and a second end ring joint 140b of the end ring joints 140a,b,c,d can be secured to or formed with the second ring end 138b. The end ring joints 140a,b can extend substantially radially outward from the respective ring ends 138a,b with respect to the axis 101.

The second split ring 132b can also be shaped as a major arc extending about the axis 101, and the second split ring 132b can encircle a majority of a circumference of the second body end 115b. The second split ring 132a can define a first ring end 138c and a second ring end 138d. The second bridge piece 134b can circumferentially overlap the first ring end 138c and the second ring end 138d and extend across the distance from the first ring end 138c to the second ring end 138d. The second split ring 132b and the second bridge piece 134b can together completely encircle the circumference of the second body end 115b. A first end ring joint 140c of the end ring joints 140a,b,c,d can be attached to the first ring end 138c, and a second end ring joint 140d of the end ring joints 140a,b,c,d can be attached to the second ring end 138d. The end ring joints 140c,d can extend substantially radially outward from the respective ring ends 138c,d with respect to the axis 101.

In some aspects, as shown, the bar linkage 170 can be in a disengaged position corresponding to an untightened condition of the pipe coupling 100, and the first pipe element 210 and/or the second pipe element 220 can be freely inserted or removed from the pipe coupling 100. In the disengaged position, each of the first split ring 132a and the second split ring 132b can be in a relaxed state. In the relaxed state, each of the seals 300a,b can be uncompressed, and a gap can be defined between the seals 300a,b and the respective pipe elements 210, 220. The seals 300a,b may not form a seal with the respective outer pipe surfaces 212, 222 when the seals 300a,b are uncompressed and the split rings 132a,b are in the relaxed state. Each split ring 132a,b can be resilient, and each split ring 132a,b can define a positional memory which biases the split rings 132a,b towards the relaxed state.

The first split ring 132a can define a groove 150a extending circumferentially around the first split ring 132a from the first ring end 138a to the second ring end 138b. Similarly, the second split ring 132b can define a groove 150b extending circumferentially around the second split ring 132b from the first ring end 138c to the second ring end 138d. Each of the grooves 150a,b can be configured to receive a one of the flanges 114a,b of the coupling body 110 to secure the end ring 130a,b to the respective body ends 115a,b. The first ring ends 138a,c can be stretched away from the respective second ring ends 138b,d in order to provide clearance for the split rings 132a,b to slip over the respective flanges 114a,b and into the grooves 150a,b.

The tensioner 176 can control a position of the bar linkage 170 and a tension in each of the split rings 132a,b. Tensioning the tensioner 176 can draw the bars 172a,b together in a tensioning direction 104 which draws the first rings ends 138a,c towards the respective second ring ends 138b,d, thereby increasing the tension within the respective split rings 132a,b. Releasing the tensioner 176 can allow the bars 172a,b to move in a relaxing direction 102 which spreads the bars 172a,b further apart from one another which allows the first ring ends 138a,c and second rings ends 138b,d to spread apart, thereby relaxing the tension of the split rings 132a,b. Tensioning the tensioner 176 can place the bar linkage 170 in an engaged position as shown. Releasing the tensioner 176 can place the bar linkage 170 in a disengaged position as shown.

Figure 3:
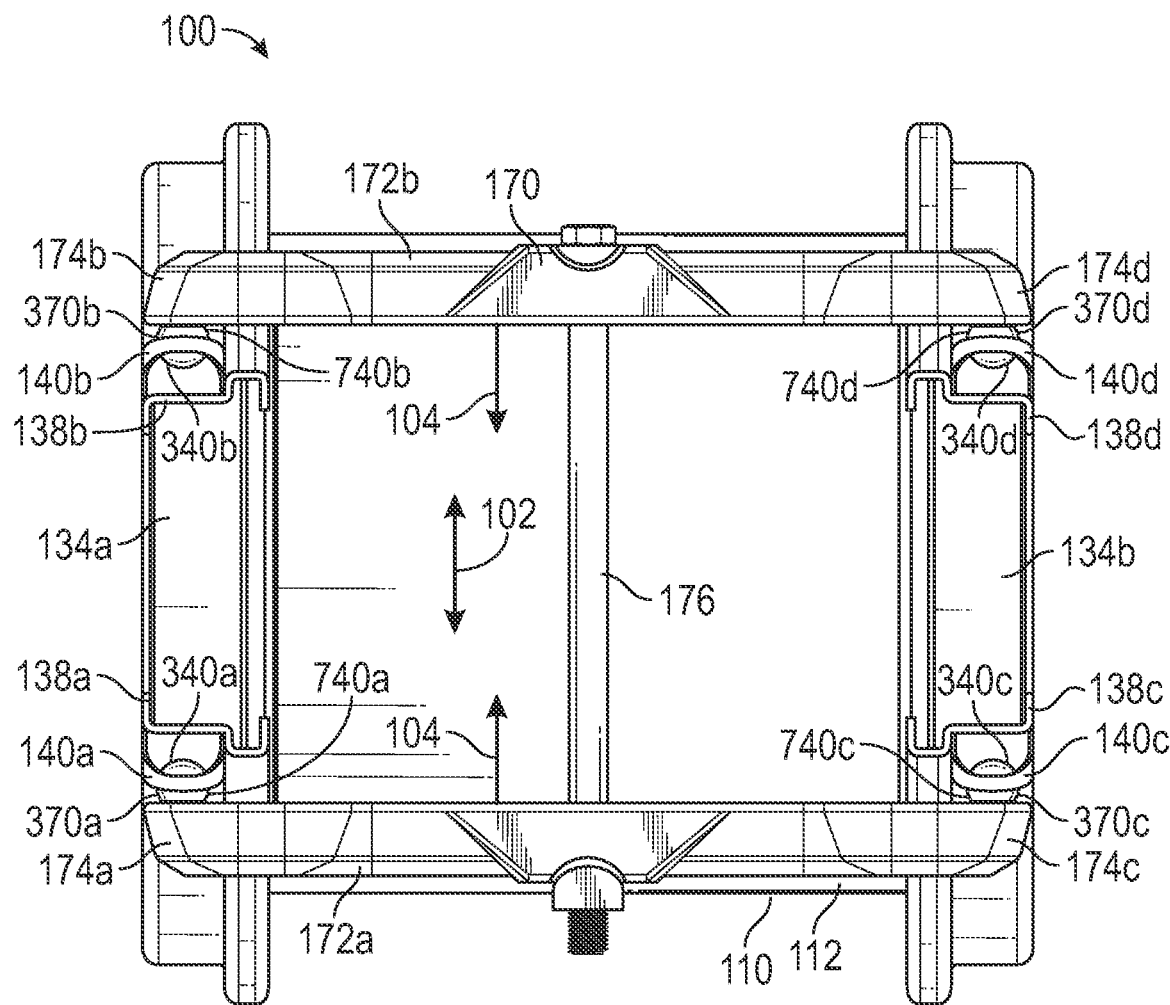
FIG. 3 is a top plan view of the pipe coupling of FIG. 1.
Figure 4:
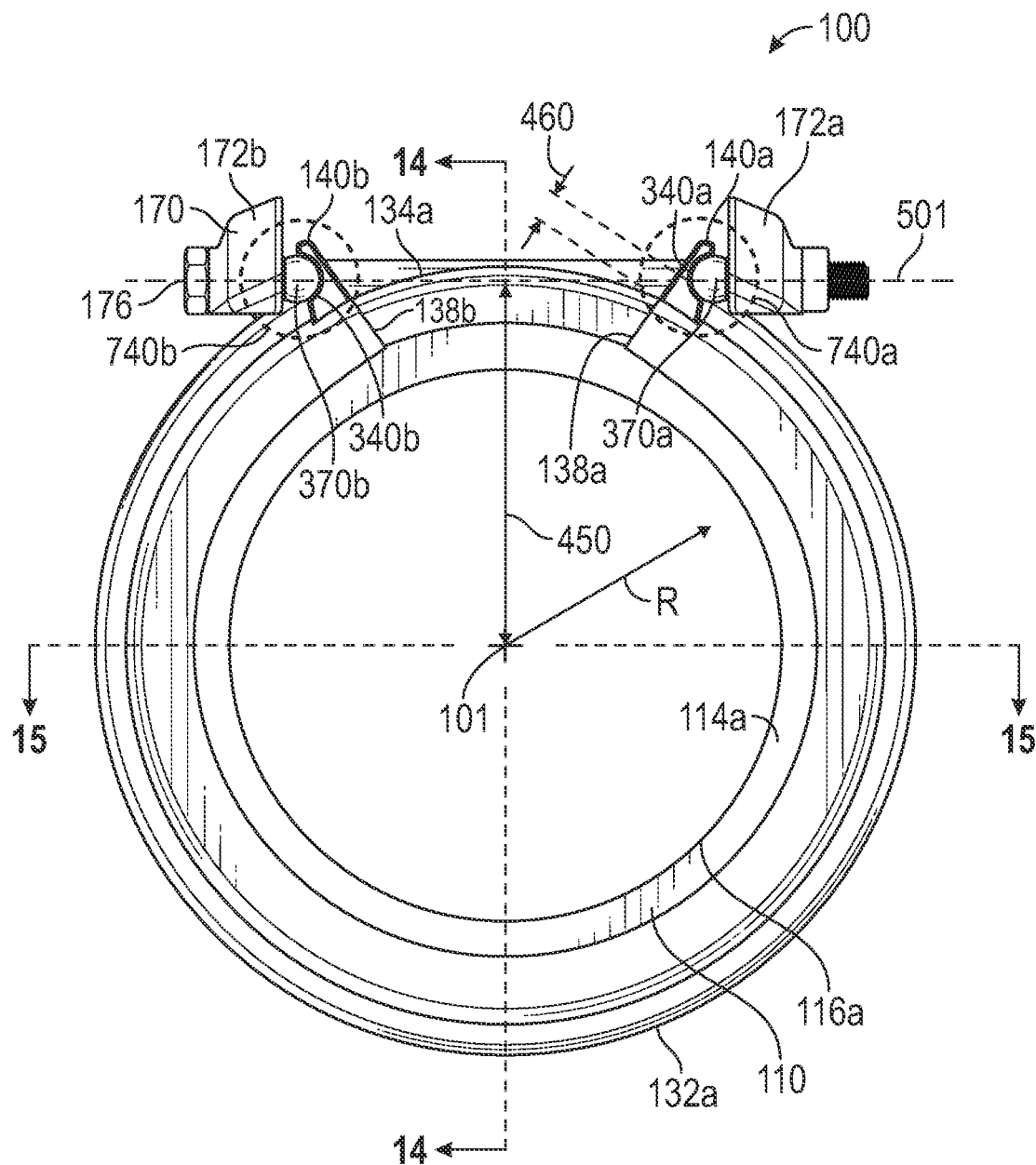
FIG. 4 is an end view of the pipe coupling of FIG. 1 showing a portion of the first end ring in cross-section where in contact with the bar linkage.

As shown in FIGS. 3 and 4, the first bar 172a can define a ball 370a,c disposed at each bar end 174a,c, respectively. Similarly, the second bar 172b can define a ball 370b,d disposed at each bar end 174b,d, respectively. Each end ring joint 140a,b,c,d can define a concave socket 340a,b,c,d, respectively. The concave sockets 340a,b,c,d can each be configured to receive a different one of the balls 370a,b,c,d, respectively, to from a ball joint 740a,b,c,d. With the bar linkage 170 in the disengaged position, the bar linkage 170 can be attached to the end rings 130a,b by compressing the first ring ends 138a,c slightly towards the second ring ends 138b,d and engaging the balls 370a,b,c,d with the respective concave sockets 340a,b,c,d. Because of the concave shape of the concave sockets 340a,b,c,d, the balls 370a,b,c,d inside the concave sockets 340a,b,c,d, thereby retain the bar linkage 170 in place and attach the bar linkage 170 to each end ring 130a,b. In some aspects, the end ring joints 140a,b,c,d can define the balls 370a,b,c,d and the bars 172a,b can define the sockets 340a,b,c,d.

Figure 14:
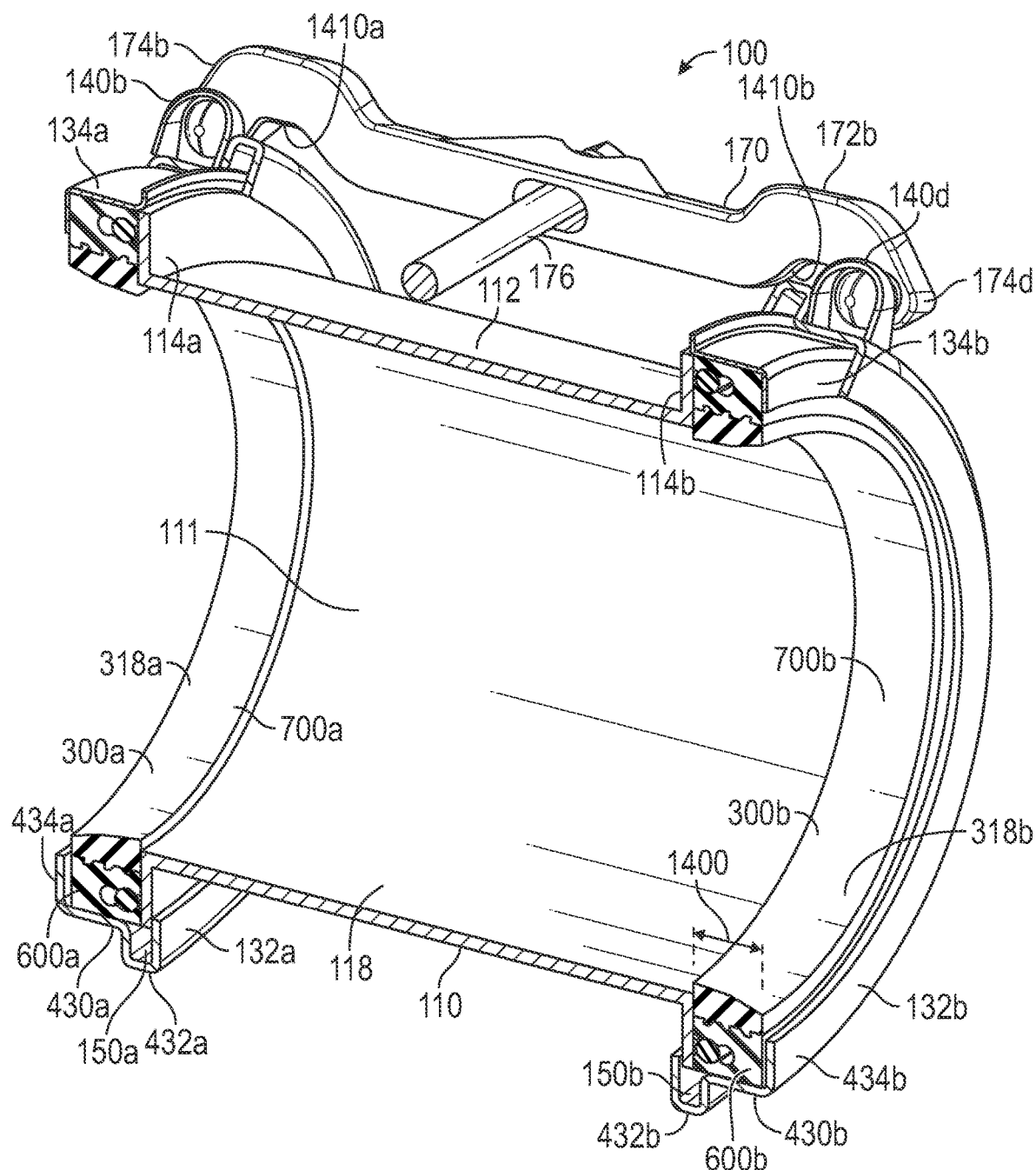
FIG. 14 is a sectional perspective view of the pipe coupling of FIG. 1 in an untightened condition taken along line 12-12 of FIG. 4.

As shown in FIG. 4 and as reflected in other figures, each of the bars 172a,b can be shaped to minimize a distance in a radial direction R between a closest portion of an axis 501 along which the fastener 510 of the tensioner 176 is aligned and the coupling body 110, the radially innermost portion of the end ring joints 140a,b,c,d, or the axis 101. More specifically, as shown in FIG. 14, these distances can be reduced by shaping each of the bars 172a,b to curve around the end rings 130a,b or by otherwise defining cutouts 1410a,b (shown in FIG. 14) in a radially inward facing surface of each of the bars 172a,b. For example and without limitation, minimizing an offset distance 450 measured from the axis 101 to the axis 501 and an offset distance 460 measured from an intersection of the split ring 132a,b and the end ring joint 140a,b,c,d to an intersection of the ball 370a,b,c,d and the corresponding socket 340a,b,c,d can reduce the stress on the welded connection between the end ring joints 140a,b,c and the end rings 130a,b and can also reduce the overall size of the pipe coupling 100. As shown in FIG. 4, the axis 501 can be aligned in a horizontal plane with the center of each ball joint 740a,b,c,d so that there is not twisting of the bar linkage 170 in a tightened position as may occur when the axis 501 is not aligned in a horizontal plane with the center of each ball joint 740a,b,c,d.

Figure 5:
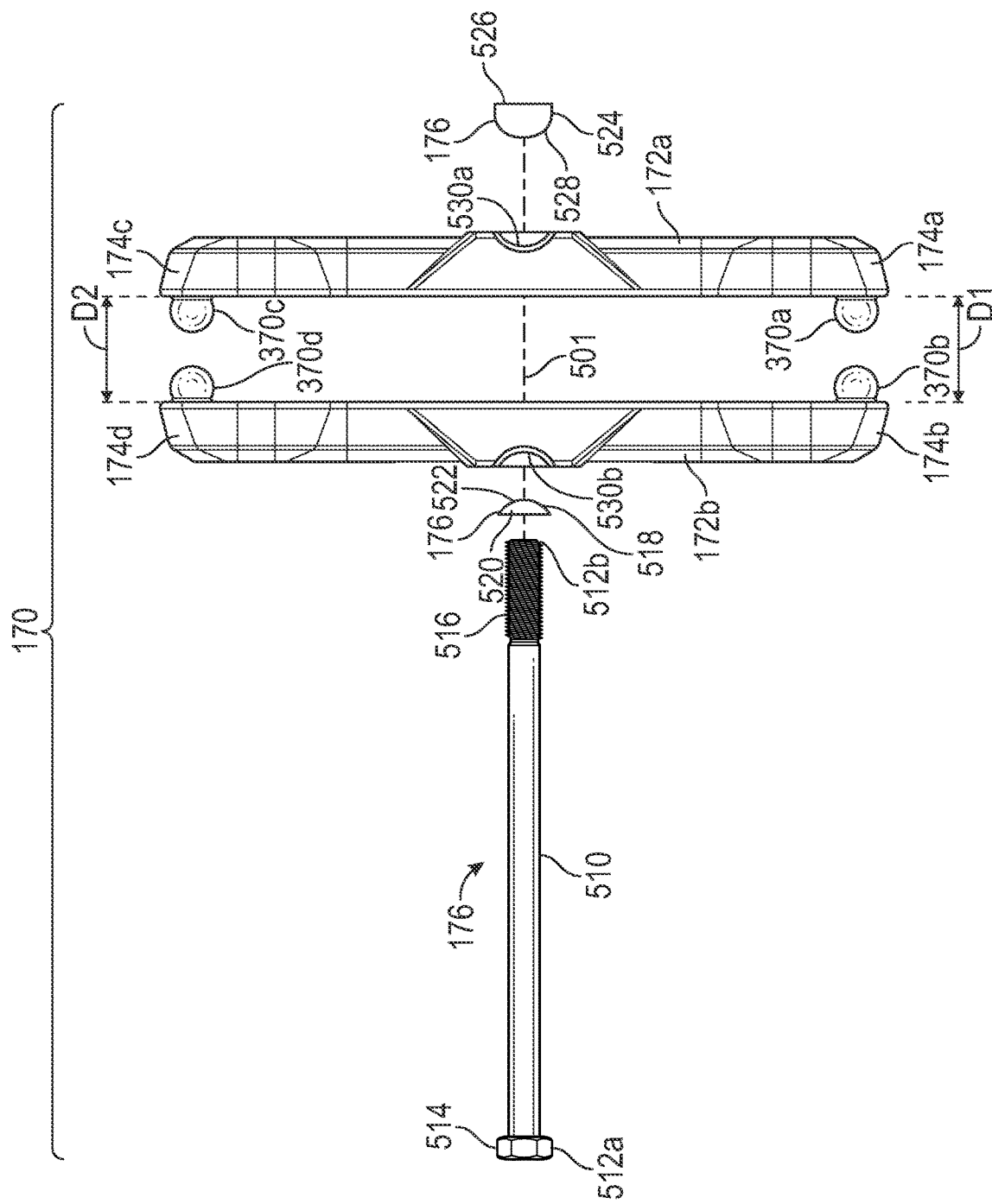
FIG. 5 is an exploded top plan view of the bar linkage of FIG. 1.

As shown in FIG. 5, the tensioner 176 can comprise a fastener 510, a washer 518, and a nut 524, which can be aligned and assembled along the axis 501. In some aspects, the fastener 510 can be a bolt as shown. In other aspects, the fastener 510 can be a different type of fastener such as a screw or any other suitable fastener. The fastener 510 can define a first end 512a and a second end 512b opposite from the first end 512a. The fastener 510 can define a head 514, which can be a hex head in some aspects, disposed at the first end 512a. The fastener 510 can define external threading 516 at the second end 512b.

The washer 518 can define a planar surface 520 and a curved surface 522 disposed opposite from the planar surface 520. The nut 524 can define a planar surface 526 and a curved surface 528 disposed opposite from the planar surface 526. In some aspects, each of the curved surfaces 522, 528 can define a convex shape, such as one being cylindrical. In other aspects, the curved surfaces 522, 528 can define a different convex shape, such as, for example and without limitation, one being spherical. Each of the bars 172a,b can define a curved surface 530a,b which can each define a concave shape formed complimentary to the curved surfaces 522, 528. As shown, each of the curved surfaces 530a,b can be defined midway between the corresponding first bar end 174a,b and the corresponding second bar end 174c,d of the respective bars 172a,b. Each of the balls 370a,b,c,d can be disposed at an inner side of the respective bar 172a,b. A distance D1 can be defined between the first bar end 174a of the first bar 172a and the first bar end 174b of the second bar 172b. A distance D2 can be defined between the second bar end 174c of the first bar 172a and the second bar end 174d of the second bar 172b.

As previously shown, the seal 300—representing each of the seals 300a,b—can be disposed within the corresponding split ring 132a,b, and the split ring 132a,b can be configured to compress the seal 300 radially inward in a compressed state of the pipe coupling 100.

Figure 6:
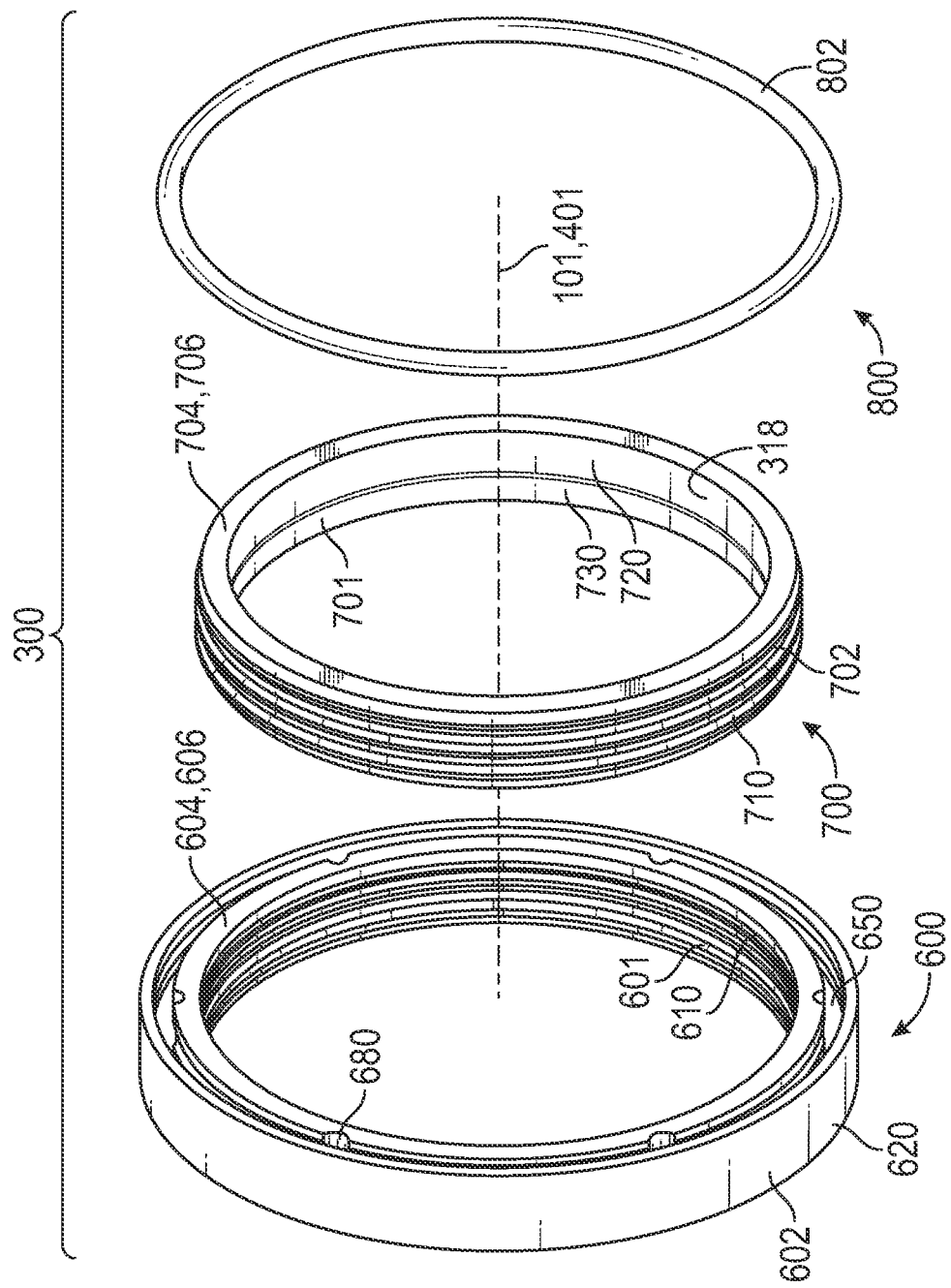
FIG. 6 is an exploded side perspective view of a seal of each of the first end ring and the second end ring of FIG. 1.
Figure 7:
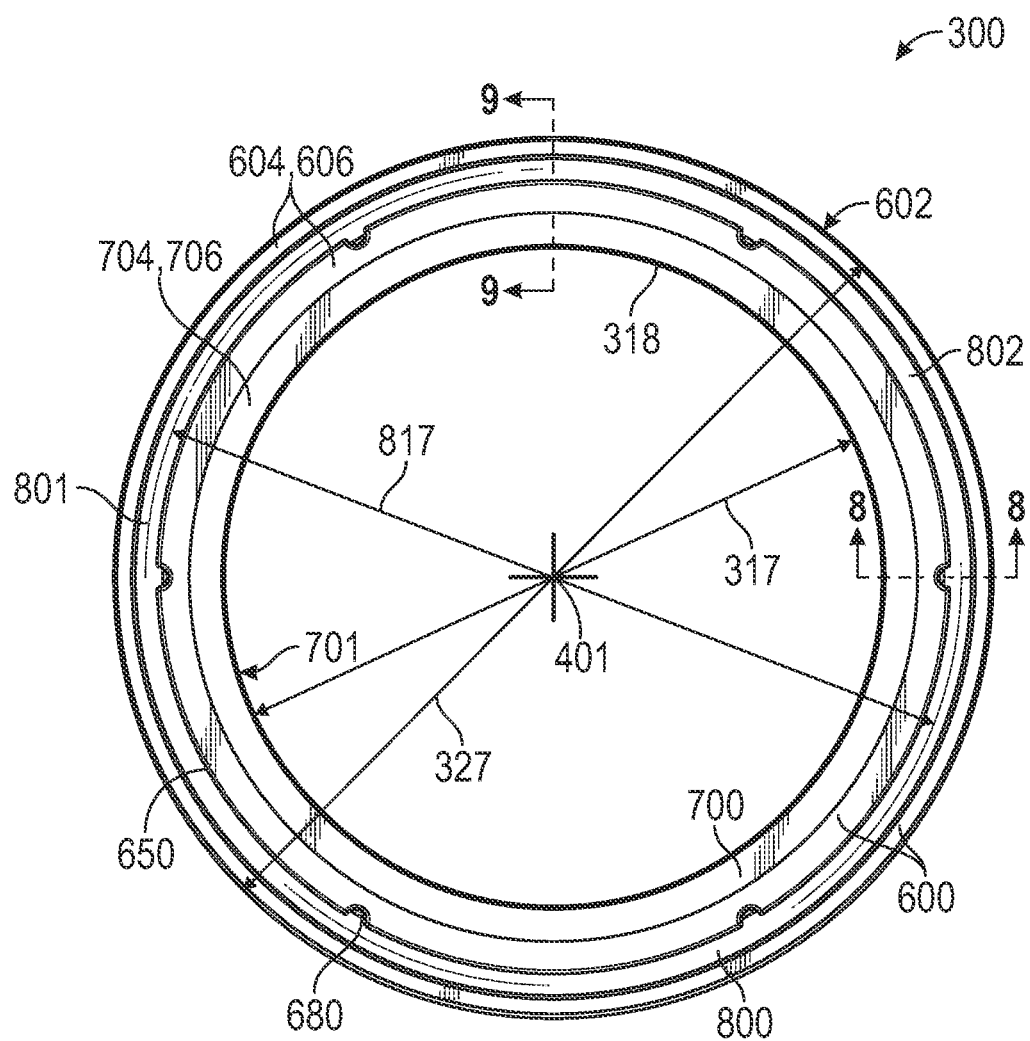
FIG. 7 is an end view of the seal of FIG. 6.
Figure 8:
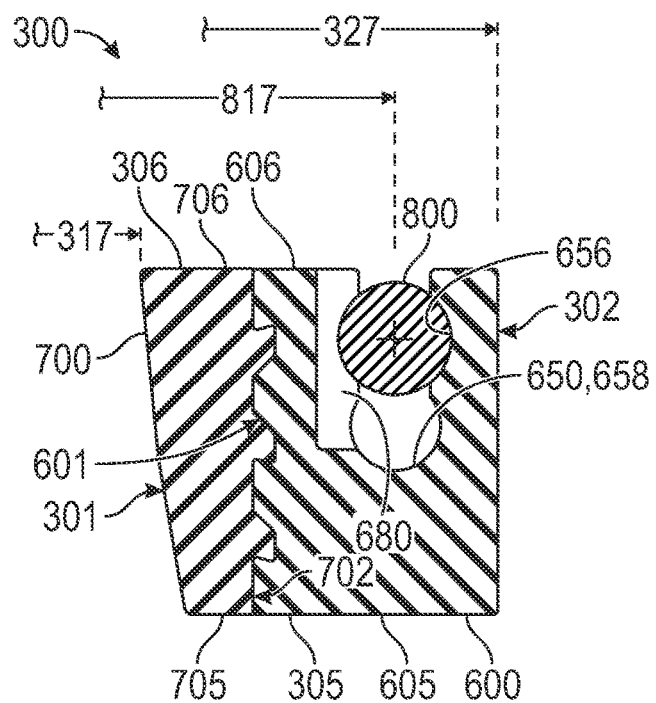
FIG. 8 is a sectional view of the seal of FIG. 6 taken along line 8-8 of FIG. 7.

As shown in FIGS. 6-8, the seal 300 can comprise an outer gasket 600, an inner gasket 700, which can also be described as a "range reducer," and an O-ring 800. The outer gasket 600, the inner gasket 700, and the O-ring 800 can be aligned and assembled along the axis 101 and a seal axis 401. As shown, each of the outer gasket 600, the inner gasket 700, and the O-ring 800 can have an annular shape. Likewise, the assembled seal 300 (shown in FIG. 7) can have an annular shape. In some aspects, the seal 300 can comprise a single O-ring 800. In other aspects, the seal 300 can comprise more than one O-ring 800. In other aspects, the seal 300 need not comprise any O-rings 800.

In some aspects, the seal 300 can define a substantially rectangular cross-section. In other aspects, the seal 300 can define a different cross-sectional shape such as, for example and without limitation, triangular, round, rhomboidal, or trapezoidal. In some aspects, the seal 300 can define grooves or channels configured to facilitate compression of the seal 300. The seal 300, in some aspects, can also define internal features, such as a seal bore 318 extending through the seal 300. The seal bore 318 can be aligned with the axis 101 and the seal axis 401.

The outer gasket 600 can define a radially inner surface 601 and a radially outer surface 602. The outer gasket 600 can define a first axial end surface 603 (shown in FIG. 9) and a second axial end surface 604 in respective axial ends 605, 606 (605 shown in FIG. 8) of the outer gasket 600. The outer gasket 600 can define a cavity 650 in one of the axial ends 605, 606. As shown, the outer gasket 600 can define the cavity 650 in the second axial end surface 604 of the second axial end 606 of the seal 300. The outer gasket 600 can further define a plurality of vacuum-release passages 680, each of which can be a hole, groove, or cutout, in the second axial end surface 604 of the second axial end 606 of the seal 300 adjacent to and intersecting the cavity 650. The radially inner surface 601 of the outer gasket 600 can define a plurality of grooves 610. The radially outer surface 602 of the outer gasket 600 can meanwhile define a cylindrical portion 620.

The inner gasket 700, which can be separably joined to the outer gasket 600, can define a radially inner surface 701 and a radially outer surface 702. By being "separably joined" to the outer gasket 600, the inner gasket 700 can be selectively separated or removed from or joined to the outer gasket 600 as desired by the user. The inner gasket 700 can define a first axial end surface 703 (shown in FIG. 10) and a second axial end surface 704 in respective axial ends 705, 706 (705 shown in FIG. 8) of the inner gasket 700. The radially outer surface 702 of the inner gasket 700 can define a plurality of ridges 710. In some aspects, the radially inner surface 701 of the inner gasket 700 can define a first conical portion 720 and a second conical portion 730 angled with respect to the first conical portion 720. In other aspects, the radially inner surface 701 of the inner gasket 700 can define a single conical portion such as the first conical portion 720. In other aspects, the radially inner surface 701 of the inner gasket 700 can define a cylindrical portion (not shown). Either one of the first conical portion 720 and the second conical portion 730 can ease installation of the pipe coupling 100 over the pipe elements 210, 220 (or, as may be desired, the insertion of the pipe elements 210, 220 into the pipe coupling 100). The incorporation of either one or both of the first conical portion 720 and the second conical portion 730 can also provide a higher stress concentration on the axial end 705, 706 of the inner gasket 700 defining the smaller diameter.

The O-ring 800 can define an outer surface 802 and an O-ring diameter 817 (shown in FIG. 7) measured to a section center 801 (shown in FIG. 7) of a cross-section of the O-ring 800. The O-ring 800 can further define a profile diameter 807 (shown in FIG. 11).

As shown in FIGS. 7 and 8, the O-ring 800 can be positioned or disposed within an outer portion 656 (shown in FIG. 8) of the cavity 650 defined in the outer gasket 600. Each of the seal 300 and the inner gasket 700 can measure a minimum inner diameter 317. Each of the seal 300 and the outer gasket 600 can measure an outer diameter 327. In some aspects, as shown, the plurality of vacuum-release passages 680 can be spaced evenly about a circumference of the seal 300, and more specifically about a circumference of a portion of the outer gasket 600. Even more specifically, the outer gasket 600 can define, for example and without limitation, six of the vacuum-release passages 680 in the second axial surface 604 of the second axial end 606. As shown in FIG. 7, each of the plurality of vacuum-release passages 680 can appear as a semicircular cutout defined in a wall at least partially defining the cavity 650 such as a radially outward facing wall 651 (shown in FIG. 9).

As shown in FIG. 8, the radially outer surface 702 of the inner gasket 700 can contact and engage the radially inner surface 601 of the outer gasket 600. The seal 300 can define a radially inner surface 301, a radially outer surface 302, a first axial end 305, and a second axial end 306. Again, the seal 300 can further define the plurality of vacuum-release passages 680, which can be defined in and extend from the second axial end 306 of the seal 300—or in and from the second axial end 606 of the outer gasket 600—or from a second axial end 306 of the seal 300—or in and from the second axial end 606 of the outer gasket 600. Each of the plurality of vacuum-release passages 680 can extend past the O-ring 800 to an inner portion 658 of the cavity 650. The inner portion 658 of the cavity 650 can be defined axially beyond the O-ring 800 relative to an axial end such as the axial end 606 in which the cavity 650 can be defined, and each of the plurality of vacuum-release passages 680 can be configured to allow movement of fluid such as water to and from the inner portion 658 of the cavity 650. In some aspects, as shown, the O-ring 800 can contact both the radially outward facing wall 651 and a radially inward facing wall 652 (shown in FIG. 9). In other aspects, the O-ring 800 can contact either the radially outward facing wall 651 or the radially inward facing wall 652 but not both of the walls 651, 652. As shown, the axial ends 605, 606 of the outer gasket 600 can be flush with the axial ends 705, 706 of the inner gasket 700.

Figure 9:
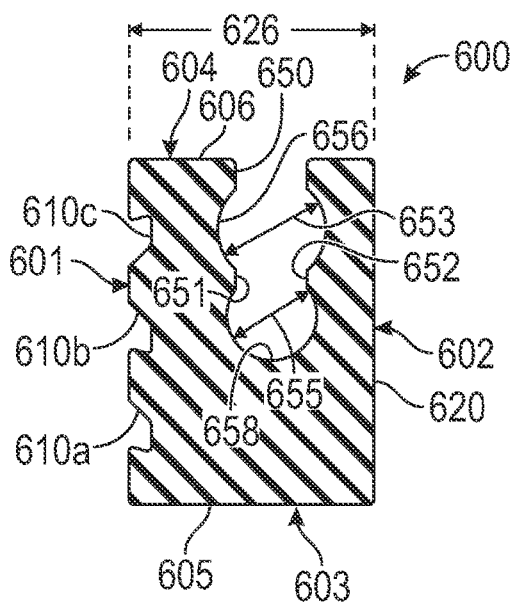
FIG. 9 is a sectional view of an outer gasket of the seal of FIG. 6 taken along line 9-9 of FIG. 7.

As shown in FIG. 9, the radially inner surface 601 of the outer gasket 600 can define a plurality of grooves 610a,b,c, each of which will be described in more detail below. Each of the plurality of grooves 610a,b,c can extend radially outward relative to the seal axis 401 of the seal 300 and into the outer gasket 600 from the radially inner surface 601. In some aspects, each of the outer portion 656 and the inner portion 658 can be circular in cross-section. More specifically, the outer gasket 600 can define a diameter 653 for the outer portion 656 of the cavity 650 and a diameter 655 for the inner portion 658 of the cavity 650. In other aspects, each of the outer portion 656 and the inner portion 658 can have a non-circular shape in cross-section. In other aspects, the outer portion 656 and the inner portion 658 need not match at all or match exactly the profile of the O-ring 800. In some aspects, the diameter 653 of the outer portion 656 can be substantially equal to the profile diameter 807 of the O-ring 800 or slightly smaller to ensure a tight fit. In some aspects, the diameter 655 of the inner portion 658 can be less than the diameter 653 of the outer portion 656. In other aspects, the diameter 655 of the inner portion 658 can be equal to or greater than the diameter 653 of the outer portion 656. A nominal thickness 626 of the outer gasket 600 in the radial direction R can be measured from a radially innermost portion of the radially inner surface 601 to the radially outer surface 602.

Figure 10:
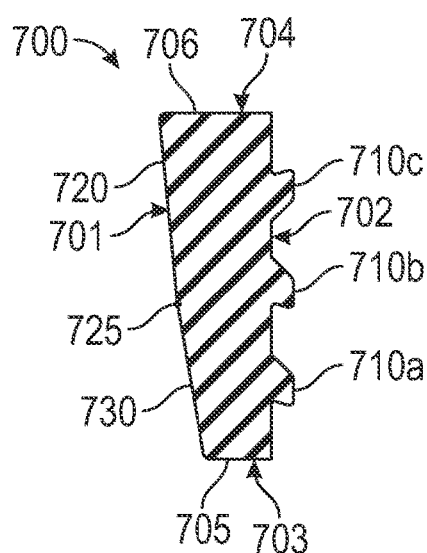
FIG. 10 is a sectional view of an inner gasket of the seal of FIG. 6 taken along line 9-9 of FIG. 7.

As shown in FIG. 10, the radially outer surface 702 of the inner gasket 700 can define a plurality of ridges 710a,b,c, each of which will be described in more detail below. Each of the plurality of ridges 710a,b,c can extend radially outward relative to the seal axis 401 of the seal 300 and away from the inner gasket 700 from the radially outer surface 702. As shown, the first conical portion 720 and the second conical portion 730 can intersect at an intersection edge 725 defined on the radially outer surface 702.

Figure 11:
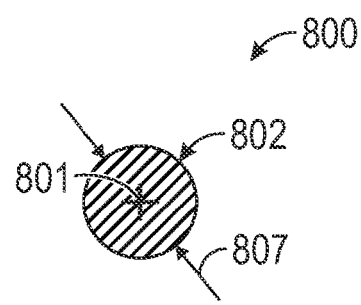
FIG. 11 is a sectional view of an O-ring of the seal of FIG. 6 taken along line 9-9 of FIG. 7.

FIG. 11 shows the O-ring 800 in cross-section with the aforementioned outer surface 802, the section center 801, and the profile diameter 807. In some aspects, as shown, the O-ring 800 can be circular in cross-section. In other aspects, the O-ring 800 can have a non-circular shape in cross-section.

Figure 12:
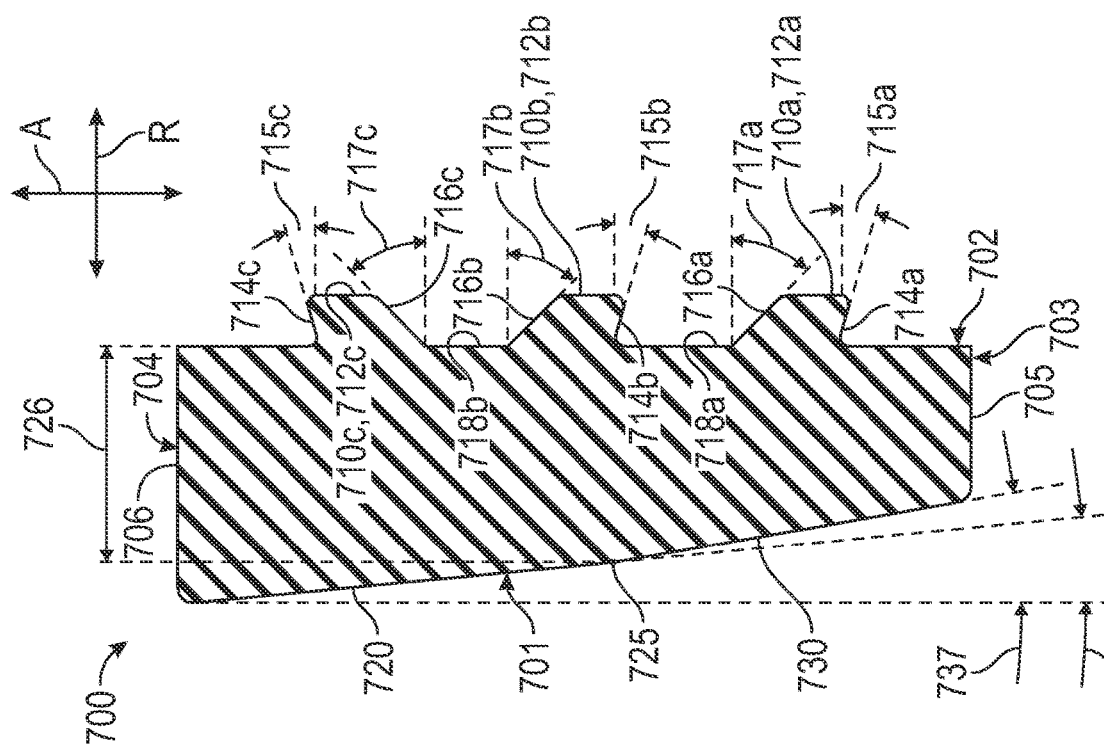
FIG. 12 is a detail sectional perspective view of the inner gasket of FIG. 10.

In some aspects, the radially inner surface 701 of the inner gasket 700 can define a conical—or frustoconical—shape in cross-section. As shown in FIG. 12, the first conical portion 720 can be angled with respect to the seal axis 401 (shown in FIG. 6) and therefore also with respect to an axial direction A by a taper angle 727, while the second conical portion 730 can be angled with respect to the seal axis 401 and therefore also the axial direction A by a taper angle 737. In some aspects, the taper angle 737 of the second conical portion 730 can be greater than the taper angle 727 of the first conical portion 720. In other aspects, the taper angle 737 of the second conical portion 730 can be less than or equal to the taper angle 727 of the first conical portion 720.

In other aspects, the radially inner surface 701 can define a single continuous conical portion 720 that can be angled with respect to the seal axis 401 and therefore also an axial direction A by the taper angle 727. In other aspects, the radially inner surface 701 of the inner gasket 700 can define a convex or rounded shape in cross-section (as shown in the pipe coupling 100 of FIG. 14). A nominal thickness 726 of the inner gasket 700 in the radial direction R can be measured from the intersection point 725 to a portion of the radially outer surface 702 not defining the ridges 710a,b,c, which can be a portion of the radially outer surface 702 from which the ridges 710a,b,c extend from.

As shown, the radially outer surface 702 of the inner gasket 700 can define the plurality of ridges 710a,b,c. Each of the plurality of ridges 710a,b,c can define a first side surface 714a,b,c and a second side surface 716a,b,c, respectively. As shown, the first side surfaces 714a,b,c can face partially radially inward and toward from the inner gasket 700, and the second side surfaces 716a,b,c can face partially radially outward and away from the inner gasket 700. In some aspects, the first side surface 714a and the second side surface 716a of the first ridge 710a of the plurality of ridges 710a,b,c can be angled in cross-section with respect to the radial direction R. Likewise, each of the first side surface 714b and the second side surface 716b of the second ridge 710b of the plurality of ridges 710a,b,c can be angled in cross-section with respect to the radial direction R of the inner gasket 700. The first side surface 714c and the second side surface 716c of the third ridge 710c of the plurality of ridges 710a,b,c can be angled in cross-section with respect to the radial direction R of the inner gasket 700.

More specifically, each of the first side surfaces 714a,b,c can be angled in cross-section with respect to the radial direction R towards a one of the axial ends 705, 706 of the inner gasket 700 by a corresponding slope angle 715a,b,c. Similarly, each of the second side surfaces 716a,b,c can be angled in cross-section with respect to the radial direction R towards a one of the axial ends 705, 706 of the inner gasket 700 by a corresponding slope angle 717a,b,c.

As shown, any one of the first side surfaces 714a,b,c and the corresponding second side surface 716a,b,c can be angled towards each other, in which case the corresponding ridge 710a,b,c can form a taper in cross-section. In other aspects, any one of the first side surfaces 714a,b,c and the corresponding second side surface 716a,b,c can be angled away from each other, in which case the corresponding ridge 710a,b,c can form a dovetail shape in cross-section. In other aspects, any one of the first side surfaces 714a,b,c can be parallel to the corresponding second side surface 716a,b,c, in which case the corresponding ridge 710a,b,c can form a rectangular shape in cross-section.

Each of the ridges 710a,b,c can define a third surface 712a,b,c, which can extend from the first side surface 714a,b,c to the second side surface 716a,b,c and can thereby intersect both the first side surface 714a,b,c to the second side surface 716a,b,c. In some aspects, the third surface 712a,b,c can be aligned in cross-section with the axial direction A. In other aspects, the third surface 712a,b,c can be angled in cross-section with respect to the axial direction A.

At least one of the plurality of ridges 710a,b,c and the corresponding side surfaces 714a,b,c and 716a,b,c can be angled in cross-section with respect to the radial direction R towards the axial end 705, 706 that it opposite from the axial end 705, 706 towards which another of the ridges 710a,b,c and its corresponding side surfaces 714a,b,c are angled. For example and without limitation, each of the first side surface 714a and the second side surface 716a of the first ridge 710a can be angled in cross-section with respect to the radial direction R towards the first axial end 705 of the inner gasket 700, while each of the first side surface 714c and the second side surface 716c of the third ridge 710c can be angled in cross-section with respect to the radial direction R towards the second axial end 706 of the inner gasket 700.

Figure 13:
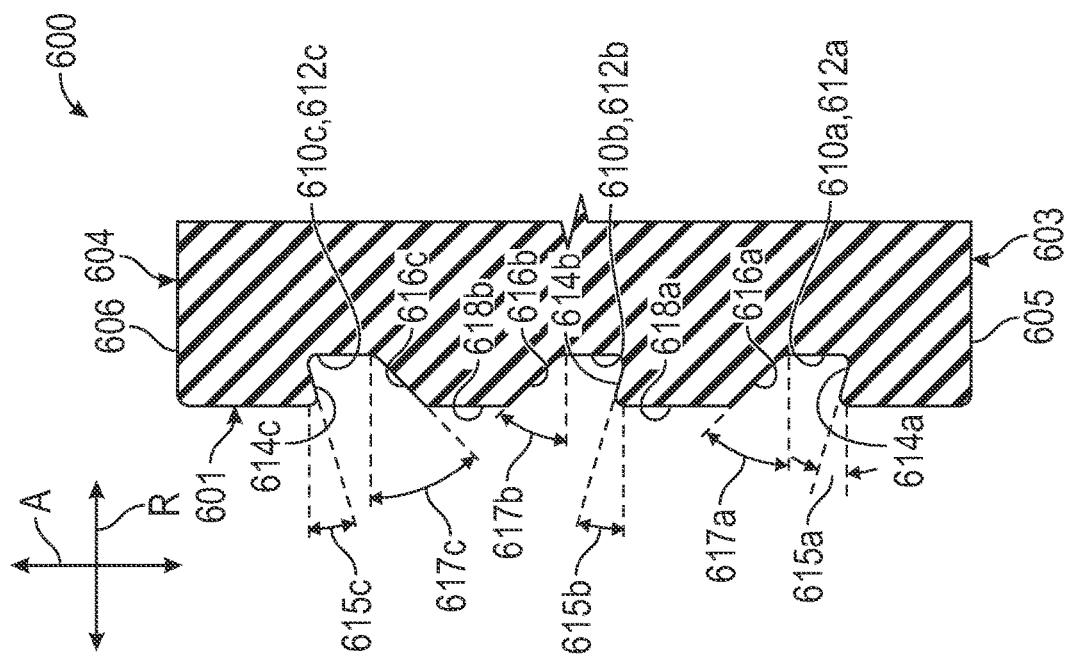
FIG. 13 is a detail partial sectional perspective view of the outer gasket of FIG. 9.

As shown in FIG. 13, the radially inner surface 601 of the outer gasket 600 can define the plurality of grooves 610a, b,c. Each of the plurality of grooves 610a,b,c can define a first side surface 614a,b,c and a second side surface 616a, b,c, respectively. As shown, the first side surfaces 614a,b,c can face partially radially outward and towards the outer gasket 600, and the second side surfaces 616a,b,c can face partially radially inward and away from the outer gasket 600. In some aspects, the first side surface 614a and the second side surface 616a of the first groove 610a of the plurality of grooves 610a,b,c can be angled in cross-section with respect to the radial direction R. Likewise, each of the first side surface 614b and the second side surface 616b of the second groove 610b of the plurality of grooves 610a,b,c can be angled in cross-section with respect to the radial direction R of the outer gasket 600. The first side surface 614c and the second side surface 616c of the third groove 610c of the plurality of grooves 610a,b,c can be angled in cross-section with respect to the radial direction R of the outer gasket 600.

Adjacent grooves 610a,b,c of the grooves 610a,b,c can form ridges 618a,b therebetween. Adjacent ridges 710a,b,c of the ridges 710a,b,c can form grooves 718a,b therebetween.

More specifically, each of the first side surfaces 614a,b,c can be angled in cross-section with respect to the radial direction R towards a one of the axial ends 605, 606 of the outer gasket 600 by a corresponding slope angle 615a,b,c. Similarly, each of the second side surfaces 616a,b,c can be angled in cross-section with respect to the radial direction R towards a one of the axial ends 605, 606 of the outer gasket 600 by a corresponding slope angle 617a,b,c.

As shown, any one of the first side surfaces 614a,b,c and the corresponding second side surface 616a,b,c can be angled towards each other, in which case the corresponding groove 610a,b,c can form a taper in cross-section. In other aspects, any one of the first side surfaces 614a,b,c and the corresponding second side surface 616a,b,c can be angled away from each other, in which case the corresponding groove 610a,b,c can form a dovetail shape in cross-section. In other aspects, any one of the first side surfaces 614a,b,c can be parallel to the corresponding second side surface 616a,b,c, in which case the corresponding groove 610a,b,c can form a rectangular shape in cross-section.

Each of the grooves 610a,b,c can define a third surface 612a,b,c, which can extend from the first side surface 614a,b,c to the second side surface 616a,b,c and can thereby intersect both the first side surface 614a,b,c to the second side surface 616a,b,c. In some aspects, the third surface 612a,b,c can be aligned in cross-section with the axial direction A. In other aspects, the third surface 612a,b,c can be angled in cross-section with respect to the axial direction A.

At least one of the plurality of grooves 610a,b,c and the corresponding side surfaces 614a,b,c and 616a,b,c can be angled in cross-section with respect to the radial direction R towards the axial end 605, 606 that it opposite from the axial end 605, 606 towards which another of the grooves 610a,b,c and its corresponding side surfaces 614a,b,c are angled. For example and without limitation, as described above each of the first side surface 614a and the second side surface 616a of the first groove 610a can be angled in cross-section with respect to the radial direction R towards the first axial end 605 of the outer gasket 600, while each of the first side surface 614c and the second side surface 616c of the third groove 610c can be angled in cross-section with respect to the radial direction R towards the second axial end 606 of the outer gasket 600.

As reflected in the angle of one or more of the side surface such as the side surfaces 614a,b,c and the side surfaces 714a,b,c, each of the grooves 610a,b,c of the outer gasket 600 and each of the ridges 710a,b,c of the inner gasket 700 can define an edge that overhangs slightly past a base portion of the groove 610a,b,c or the ridge 710a,b,c. More specifically, portions of the side surfaces 614a,b,c as well as a radially innermost portion of the radially inner surface 601 of the outer gasket 600 can overhang the third surfaces 612a,b,c (which can define a radially outermost portion of the radially inner surface 601 of the outer gasket 600). Likewise, portions of the side surfaces 714a,b,c as well as the third surfaces 712a,b,c (which can define a radially outermost portion of the radially outer surface 702 of the inner gasket 700) can overhang a radially innermost portion of the radially outer surface 702, which can comprise the grooves 718a,b. These "overhanging" features of the grooves 610a,b,c of the outer gasket 600 and the ridges 710a,b,c of the inner gasket 700 can create interference between the outer gasket 600 and the inner gasket 700. This interference can be beneficial in keeping the inner gasket 700 locked to the outer gasket 600 in a similar manner to a "tail" of a dovetail joint being held captive between "pins" of a dovetail joint. This interference can also be overcome with a prying force when an installation does not require the inner gasket 700. In some aspects, as shown, the side surfaces 714a,b,c that resemble a dovetail in structure and appearance—for example, the side surfaces 714a and 714c—can be defined in separate ridges 710a,b,c such as the ridges 710a,c. In other aspects, as described herein, the individual ridges 710a,b,c can form a dovetail shape in cross-section.

As shown, a width and a height of the grooves 610a,b,c and the corresponding ridges 710a,b,c can be based on the ability of the grooves 610a,b,c to provide the desired stress concentration and on the tolerances associated with the materials and manufacturing methods used in fabricating the seal 300a,b.

Figure 15:
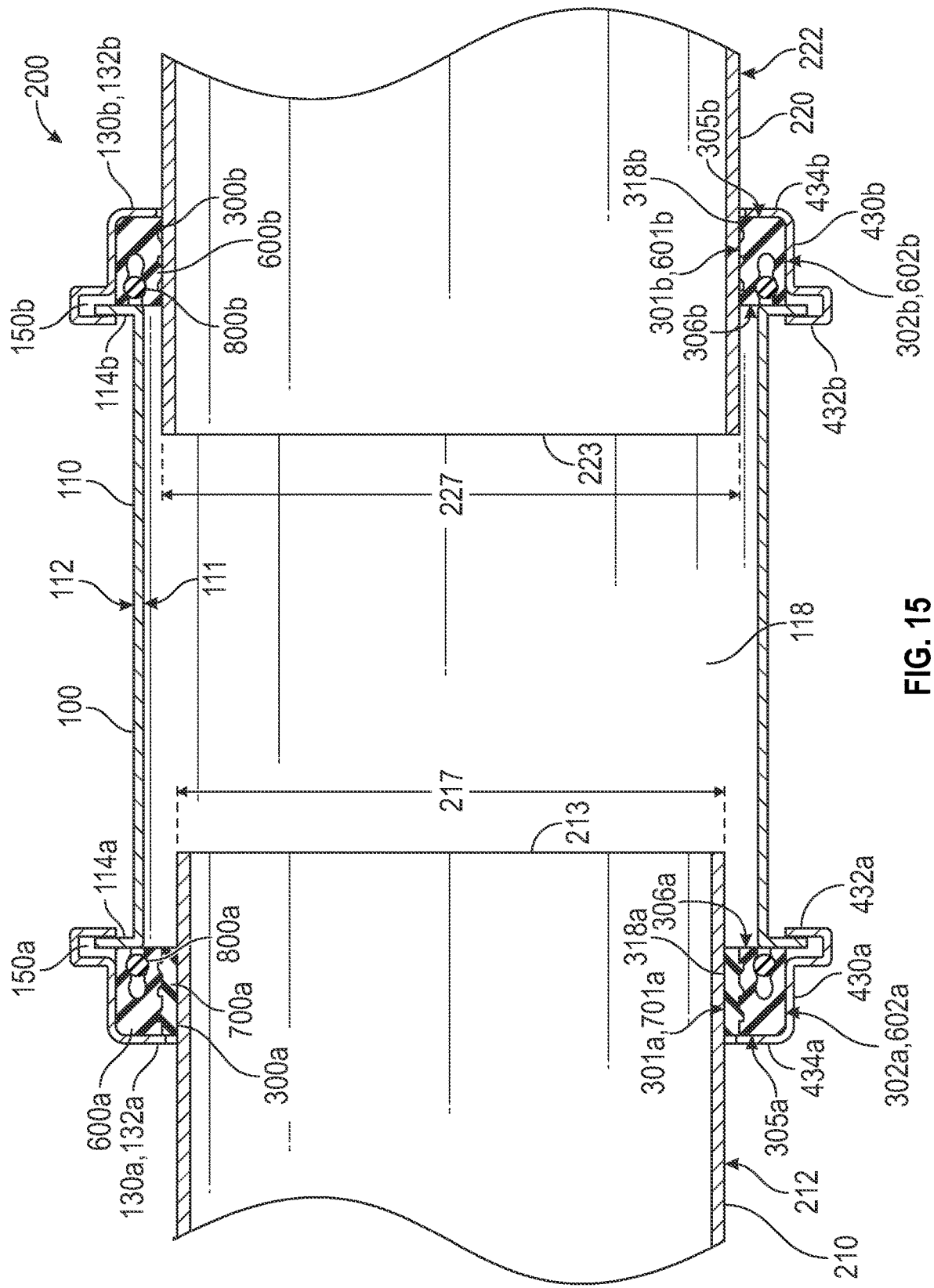
FIG. 15 is a sectional view of the pipe connection assembly of FIG. 1 in an assembled and tightened condition from the perspective of line 15-15 of FIG. 4 in accordance with another aspect of the current disclosure in which the second pipe has a larger diameter than the first pipe.

Each of FIGS. 14 and 15 is a cross-section of the pipe connection assembly 200 taken along lines 14-14 and 15-15 in FIG. 4. As shown in FIG. 14, the bar linkage 170 can be in the disengaged position, and each of the split rings 132a,b can be in the relaxed state. As shown in FIG. 15, the bar linkage 170 can be in the engaged position, and each of the split rings 132a,b can be in the tensioned state. In each of the relaxed state and the tensioned state, the seal 300a,b can define an axial length 1400.

To assemble the first end ring 130a, the first bridge piece 134a can be inserted into a gap defined between the first ring end 138a and the second ring end 138b to bridge the gap (and similarly, the bridge piece 134b can be inserted into a second gap defined between the first ring end 138c and the second ring end 138c to bridge the second gap). A length of the bridge piece 134a,b can be longer than the gap. Consequently, the first bridge piece 134a,b can overlap the first ring end 138a and the second ring end 138b. The groove 150a,b can receive portions of an outer radial shoulder of the bridge piece 134a,b. With the bridge piece 134a,b bridging the gap between the corresponding ring ends 138a,b,c,d, the bridge piece 134a,b and the split ring 132a,b can define a substantially circular shape.

The seal 300a,b can be inserted into the split ring 132a,b and the bridge piece 134a,b from an axially inner side of the split ring 132a,b to complete assembly of the end ring 130a,b. With the seal 300a,b inserted into the split ring 132a,b and the bridge piece 134a,b, the first axial end 305a,b (shown in FIG. 15) can be in facing engagement with an inner radial shoulder 434a,b of the first split ring 132a,b and a corresponding inner radial shoulder of the bridge piece 134a. With the seal 300a,b positioned within the split ring 132a,b, the bridge piece 134a,b can be retained within the split ring 132a by preventing removal of the outer radial shoulder of the bridge piece 134a,b from the groove 150a,b. The radially outer surface 302a,b (shown in FIG. 15) can be positioned in facing engagement with an arcuate portion 430a,b of the split ring 132a,b and the arcuate portion of the bridge piece 134a,b. Mounting the end ring 130a,b on the flange 114a,b of the coupling body 110 can position the second axial end 306a,b (shown in FIG. 15) of the seal 300a,b in facing contact with the flange 114a,b, as shown and further described with respect to FIG. 15.

The first split ring 132a can be circumferentially constricted to a tensioned state (shown in FIG. 15) by drawing the first ring end 138a and the second ring end 138b together, thereby increasing tension within the first split ring 132a (and similarly the second split ring 132b can be circumferentially constricted to the tensioned state by drawing the first ring end 138c and the second ring end 138d together, thereby increasing tension within the second split ring 132b). The first ring end 138a,c can be drawn towards the second ring end 138b,d by tensioning the tensioner 176 (shown in FIG. 1) of the bar linkage 170 (shown in FIG. 1), to reduce the respective gap between the ring ends 138a,b and 138c,d. Circumferentially constricting the split ring 132a,b can compress the seal 300a,b radially inward. Such radial compression can cause the seal 300a,b to form a seal with the outer pipe surface 212, 222 (shown in FIG. 15) of the pipe elements 210, 220 (shown in FIG. 15). The bridge piece 134a,b can prevent seal 300a,b from bunching, kinking, or bulging during circumferential constriction.

In the tensioned state, as shown in FIG. 15, each of the split rings 132a,b can be circumferentially constricted around the seal 300a,b and the bridge piece 134a, respectively, thereby reducing the diameter of the respective split ring 132a,b. The seal 300a,b can thereby be radially compressed against the outer pipe surface 212, 222 of the pipe elements 210, 220. Engagement between each of the flanges 114a,b and the corresponding groove 150a,b can prevent the split ring 132a,b from warping or deforming during tensioning of the tensioner 176 and circumferential constriction of the split ring 132a,b.

The radial compression of the seal 300a,b can cause the seal bore 318a,b to form a seal with the outer pipe surface 212, 222. Radial compression of the seal 300a,b additionally can cause the seal 300a,b to deform and axially lengthen due to von Mises stress within the seal 300a,b and the Poisson effect. The axial lengthening of the seal 300a,b can be restrained between the flange 114a,b and the split ring 132a,b or the bridge piece 134a,b. Residual pressure between the flange 114a,b and the axial end 306a,b of the seal 300a,b can produce a seal between the seal 300a,b and the flange 114a,b.

Circumferential constriction of each split ring 132a,b can be limited by either interference between the first ring ends 138a,c (shown in FIG. 2) and the respective second ring ends 138b,d (also shown in FIG. 2) or interference between the flanges 114a,b and an outer radial lip 432a,b of the respective split ring 132a,b. Regarding interference between the first ring ends 138a,c and the second ring ends 138b,d, once the first ring ends 138a,c contact the second ring ends 138b,d, the respective split ring 132a,b cannot be further circumferentially constricted. Regarding interference between the flanges 114a,b and the respective outer radial lips 432a,b, once the flanges 114a,b bottom out in the respective grooves 150a,b of the outer radial lips 432a,b, the respective split ring 132a,b cannot be further circumferentially constricted. In some aspects, seals or gaskets defining an increased radial thickness compared to the seal 300a,b of the present disclosure can be used to further accommodate pipes defining different outer diameters.

The pipe coupling 100 can be compatible with a range of outer diameters for the pipe elements 210, 220. The pipe coupling 100 can also be used to join pipe elements 210, 220 defining different outer diameters as shown, such as joining the pipe element 210 defining an outer diameter 217 to a pipe element 220 defining an outer diameter 227, including when the outer diameter 217 is less than the outer diameter 227. A diameter of the bore openings 116a,b can be an upper limit for the outer diameter of compatible pipe elements 210, 220. As shown, the seals 300a,b can extend radially inward from the bore openings 116a,b, and the pipe coupling 100 can accommodate pipes of larger outer diameter than the pipe elements 210, 220 shown. The pipe coupling 100 can also accommodate pipe elements having a smaller or larger outer diameter than the pipe elements 210, 220 shown. In some aspects, as shown, each of the grooves 150a,b provides additional clearance to further circumferentially constrict each split ring 132a,b, which can further compress the seals 300a,b and the gasket bores 318a,b radially inward.

The accommodation of different outer diameters 217, 227 of the pipe elements 210, 220 can be facilitated by the aforementioned exemplary structure of the seals 300a,b. In some aspects, as shown, during installation of the first end ring 130a to the pipe element 210 the seal 300a can comprise the outer gasket 600a, the inner gasket 700a, and the O-ring 800a. More specifically, the radially inner surface 701a of the inner gasket 700a—and the radially inner surface 301a of the seal 300a—can guide, compress, and seal against the outer pipe surface 212 of the pipe element 210 such that the bore 318 of the seal 300a effectively conforms to the outer diameter 217 of the pipe element 210. The ridges 710a,b,c of the inner gasket 700a can engage with and lock in a fixed axial position with the grooves 610a,b,c of the outer gasket 600a. The O-ring 800a can transfer a compressive load acting on the split ring 132a against the radially outer surface 602 proximate to the second axial end 306a of the seal 300a through the outer gasket 600a to the inner gasket 700a. At the same time, the presence of the cavity 650 (shown in FIG. 8) and the vacuum-release passages 680 can facilitate compression of the seal 300a under a wider range of dimensions of the outer diameter 217 of the pipe element 210 than would be possible with the seal 300a defines a solid cross-section throughout without the cavity 650. As a result, a manufacturer, a distributor, and a user of such pipe couplings can fabricate or have available a smaller number of variations of the seal 300a,b and the pipe coupling 100 (i.e., a smaller inventory of parts) for the various size pipe elements 210, 220 that may be encountered. In addition, a user may quickly change between diameter ranges without tools and without complete removal of the seal 300a,b from the pipe coupling 100.

In other aspects, also as shown, during installation of the second end ring 130b to the pipe element 220 the seal 300b can comprise only the outer gasket 600b and the O-ring 800b. More specifically, the radially inner surface 601b of the outer gasket 600b—and the radially inner surface 301b of the seal 300b—can guide, compress, and seal against the outer pipe surface 222 of the pipe element 220 such that the radially inner surface 601 of the seal 300b effectively conforms to the outer diameter 227 of the pipe element 220. The grooves 610a,b,c of the outer gasket 600b can engage with and through friction lock in an axial position with the pipe element 220. The O-ring 800a can transfer a compressive load acting on the split ring 132a against the radially outer surface 602 proximate to the second axial end 306b of the seal 300b through the outer gasket 600b to the outer pipe surface 222 of the pipe element 220.

In some aspects, as shown, an end 213 of the pipe element 210 and an end 223 of the pipe element 220 can define a gap therebetween. In other aspects, the end 213 of the pipe element 210 and the end 223 of the pipe element 220 can abut each other. In other aspects, the coupling body 110 can accommodate an angle between the pipe axis 201 (shown in FIG. 1) of the pipe element 210 and the pipe axis 202 (shown in FIG. 1) of the pipe element 220. When the inner gasket 700b is absent, as reflected in FIG. 15, the grooves 610a,b,c of the outer gasket 600b can function as stress concentrators by reducing the contact area between the outer gasket 600b and the pipe element 220, including by encouraging the gasket to flow into and around any irregularities in the outer pipe surface 222 of the pipe element 220.

A method of using the pipe coupling 100 can comprise comparing the minimum inner diameter 317 of the first seal 300a of the pipe coupling 100 to an outer diameter 217 of the pipe element 210 to which the pipe coupling 100 can be assembled. The method can comprise disposing the first seal 300a within the first split ring 132a of the pipe coupling 100. The method can comprise compressing the first seal 300a radially inward in a compressed state of the pipe coupling 100. The method can comprise removing the first inner gasket 700a from the first seal 300a and, more specifically, from the first outer gasket 600a.

The method of using the pipe coupling 100 can comprise assembling the pipe coupling 100 to the pipe element 210, 220 such that the radially inward surface of the outer gasket 600 contacts the outer pipe surface 212, 222 of the pipe element 210, 220. The method can comprise re-assembling the inner gasket 700 to the outer gasket 600 of the seal 300.

The method of using the pipe coupling 100 can further comprise comparing the inner diameter 317 of the second seal 300b of the pipe coupling 100 to the outer diameter 227 of the second pipe element 220 to which the pipe coupling 100 can be assembled. The method can comprise disposing the second seal 300b within the second split ring 132b of the pipe coupling 100. The method can comprise compressing the second seal 300b radially inward in a compressed state of the pipe coupling 100. The method can comprise removing the second inner gasket 700b from the second seal 300b and, more specifically, from the second outer gasket 600b. The method can comprise reattaching the second inner gasket 700b to the second seal 300b and, more specifically, to the second outer gasket 600b. The method can comprise installing the seal 300a,b with both, either, or neither of the seals 300a,b fully assembled.

The tensioner 176 of the bar linkage 170 can control the position of the bar linkage 170 and the tension of the split rings 132a,b. In the engaged position (shown in FIG. 1), the first bar 172a can be drawn towards the second bar 172b in the tensioning direction 104, thereby bringing the first bar ends 174*a,b* towards one another to reduce the distance D1 (shown in FIG. 5) and the second bar ends 174*c,d* towards one another to reduce the distance D2 (also shown in FIG. 5). Movement of the bar ends 174*a,b,c,d* can be transferred through the ball joints 740*a,b,c,d* and adjacent end ring joints 140*a,b,c,d* to the respective ring ends 138*a,b,c,d*. As a result, reducing the distance D1 between the first bar ends 174*a,b* can reduce the gap defined between the first ring end 138*a* and the second ring end 138*b*, thereby circumferentially constricting the first split ring 132*a* around the first seal 300*a*. Similarly, reducing the distance D2 between the second bar ends 174*c,d* can reduce the gap defined between the first ring end 138*c* and the second ring end 138*d*, thereby circumferentially constricting the second split ring 132*b* around the second seal 300*b*. As previously discussed, circumferentially constricting the split rings 132*a,b* around the seals 300*a,b* can compress the seals 300*a,b* radially inward to form a seal with the outer pipe surfaces 212, 222 of the respective pipe elements 210, 220.

The engagement between the curved surfaces 522, 528 of the washer 518 and the nut 524, respectively, and the curved surfaces 530*a,b* of the bars 172*a,b*, respectively, can allow the tensioner 176 to pivot relative to each of the bars 172*a,b*. The taper of bar bores through which the fastener 510 can extend can provide clearance for the fastener 510 to pivot relative to each of the bars 172*a,b*. The balls 370*a,b,c,d* can each engage the concave sockets 340*a,b,c,d* of the adjacent end ring joints 140*a,b,c,d*; however in other aspects, the end ring joints 140*a,b,c,d* can define the balls 370*a,b,c,d* and the bars 172*a,b* can define the concave sockets 340*a,b,c,d*.

Each pair of engaged balls 370*a,b,c,d* and concave sockets 340*a,b,c,d* can define the ball joint 740*a,b,c,d*. The ball joints 740*a,b,c,d* can permit the bars 172*a,b* to pivot relative to the end ring joints 140*a,b,c,d* and the end rings 130*a,b*. In the present aspect, the ball joints 740*a,b,c,d* can be open ball joints 740*a,b,c,d*, which can permit the balls 370*a,b,c,d* to be disengaged from the concave sockets 340*a,b,c,d*, such as to remove the bar linkage 170 from the end rings 130*a,b*. In other aspects, the ball joints 740*a,b,c,d* can be captured ball joints which do not permit the balls 370*a,b,c,d* to be disengaged from the concave sockets 340*a,b,c,d*.

Pivoting of the tensioner 176 relative to the bars 172*a,b* and of the bars 172*a,b* relative to the end rings 130*a,b* can self-balance tension between the first split ring 132*a* and the second split ring 132*b* to provide uniform hoop stress through each split ring 132*a,b* and equal compression of each seal 300*a,b*. For example, if the first split ring 132*a* momentarily experiences greater hoop stress than the second split ring 132*b*, the ball joints 740*a,b* proximate to the first split ring 132*a* can momentarily act as stationary pivots. A torque provided by the tensioner 176 can act around the ball joints 740*a,b* to draw the first ring end 138*c* towards the second ring end 138*d* of the second split ring 132*b* until hoop stress can be equalized between the split rings 132*a,b*.

Similarly, including when the outer diameter 227 of the second pipe element 220 is larger than the outer diameter 217 of the first pipe element 210, the bars 172*a,b* can pivot relative to the tensioner 176 to equalize hoop stress between the split rings 132*a,b*. In such an application, the distance D1 can be smaller than the distance D2, and the gap between the ends 138*a,b* can be smaller than the gap between the ends 138*c,d*. The bars 172*a,b* can angle inwards from the first bar ends 174*a,b* towards the second bar ends 174*c,d*. The pipe coupling 100 therefore can provide the advantage of coupling two pipe elements 210, 220 of different outer diameters 217, 227.

Another advantage of the pipe coupling 100 can be that the pipe coupling 100 can be attached and sealed to two pipe elements 210, 220 to form the pipe connection assembly 200 by tightening the single fastener 510. Other pipe couplings typically require the tightening of two or more fasteners to form the pipe connection assembly 200. Tightening multiple fasteners can require additional time to install the couplings. Additionally, limited access can make it difficult to reach and tighten multiple fasteners in some installations, such as when installing a pipeline in a trench. Additionally, if the fasteners of a coupling are tightened to different torque levels, the seals between the coupling and the pipe lengths can be compromised due to unequal compressive stresses within the gaskets. Unequal compressive stresses can lead to wrinkles or kinks within the seals or gaskets, which can comprise the seal provided and result in leaks.

In some aspects, the seal 300 or any portion thereof can comprise an elastomeric sealing material such as, for example and without limitation, Buna-N rubber (i.e., nitrile), ethylene propylene diene monomer (EPDM) rubber, or silicone. In other aspects, the seal 300 or any portion thereof can comprise a non-elastomeric material. In some aspects, the seal 300 or any portion thereof can have a material hardness in a range of about 50 to about 100 on the Shore A scale. In some aspects, the seal 300 or any portion thereof can have a material hardness in a range of about 70 to about 80 on the Shore A scale. In some aspects, the seal 300 or any portion thereof can have a material hardness of about 75 on the Shore A scale. In some aspects, the seal 300 or any portion thereof can have a material hardness of greater than about 100 or less than about 50 on the Shore A scale.

In some aspects, portions of the pipe coupling 100 can comprise a metal such as steel, a resin such as acrylonitrile butadiene styrene (ABS), or any other material having desirable properties. Portions of the pipe coupling 100 can be formed through subtractive manufacturing or additive manufacturing. Portions of the pipe coupling 100 can be molded or cast.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe coupling comprising:
   a coupling body defining a first body end and a second body end distal from the first body end, a coupling bore defined by and extending through the coupling body from the first body end to the second body end;
   an end ring attached to the coupling body proximate to the first body end, the end ring comprising:
     a split ring defining a first ring end, a second ring end, and a radially inner surface; and
     a seal disposed within the split ring, the split ring configured to compress the seal radially inward in a compressed state of the pipe coupling, the seal comprising:
       an outer gasket defining a radially outer surface and a radially inner surface, the radially inner surface of the outer gasket defining a plurality of grooves, each of a first side surface and a second side surface of a one of the plurality of grooves angled in cross-section with respect to a radial direction of the outer gasket towards a first axial end of the seal when the outer gasket is in an uncompressed state; and
       an inner gasket separably joined to the outer gasket, the inner gasket defining a radially outer surface, the radially outer surface of the inner gasket defining a plurality of ridges engaged with the plurality of grooves of the outer gasket, each of a first side surface and a second side surface of a first ridge of the plurality of ridges angled in cross-section with respect to a radial direction of the inner gasket towards the first axial end of the seal when the inner gasket is in an uncompressed state, the radially outer surface of the inner gasket contacting the radially inner surface of the outer gasket; and
   a fastener configured to draw the first ring end of the split ring towards the second ring end of the split ring.

2. The pipe coupling of claim 1, wherein each of a first side surface and a second side surface of a second ridge of the plurality of ridges is angled in cross-section with respect to the radial direction of the inner gasket towards a second axial end of the seal when the inner gasket is in the uncompressed state.

3. The pipe coupling of claim 1, wherein the plurality of ridges of the inner gasket further comprises a third ridge.

4. The pipe coupling of claim 1, wherein a radially inner surface of the inner gasket defines a conical shape.

5. The pipe coupling of claim 1, wherein the end ring is a first end ring, the split ring is a first split ring, the seal is a first seal, and the outer gasket is a first outer gasket;
   the coupling further comprising a second end ring attached to the coupling body proximate to the second body end, the second end ring comprising:
     a second split ring defining a first ring end, a second ring end, and a radially inner surface; and
     a second seal disposed within the split ring, the split ring configured to compress the second seal radially inward in a compressed state of the pipe coupling, the second seal comprising a second outer gasket defining a radially outer surface and a radially inner surface, the radially inner surface of the second outer gasket defining a plurality of grooves, each of a first side surface and a second side surface of a one of the plurality of grooves of the second outer gasket angled in cross-section with respect to a radial direction of the second outer gasket towards a first axial end of the second seal when the second outer gasket is in an uncompressed state.

6. A method of using the pipe coupling of claim 1, the method comprising:
   comparing an inner diameter of the seal of the pipe coupling to an outer diameter of a pipe element to which the pipe coupling is to be assembled; and
   removing the inner gasket from the seal.

7. The method of claim 6, further comprising assembling the pipe coupling to the pipe element such that the radially inner surface of the outer gasket contacts a radially outermost surface of the pipe element.

8. The method of claim 6, further comprising re-assembling the inner gasket to the outer gasket of the seal.

9. The method of claim 6, wherein the pipe element is a first pipe element, the seal is a first seal, the split ring is a first split ring, the outer gasket is a first outer gasket, and the inner gasket is a first inner gasket; the first seal positioned proximate to a first axial end of the pipe coupling, the pipe coupling further comprising a second seal positioned proximate to a second axial end of the pipe coupling; the method further comprising:
   comparing an inner diameter of the second seal of the pipe coupling to an outer diameter of a second pipe element to which the pipe coupling is to be assembled, the second seal disposed within a second split ring of the pipe coupling, the second split ring configured to compress the second seal radially inward in a compressed state of the pipe coupling, the second seal comprising:
     a second outer gasket defining a radially outer surface and a radially inner surface, the radially inner surface of the second outer gasket defining a plurality of grooves, each of a first side surface and a second side surface of a one of the plurality of grooves of the second outer gasket angled in cross-section with respect to a radial direction of the second outer gasket towards a first axial end of the second seal when the second outer gasket is in an uncompressed state; and
     a second inner gasket separably joined to the second outer gasket, the second inner gasket defining a radially outer surface, the radially outer surface of the second inner gasket defining a plurality of ridges, each of a first side surface and a second side surface of a first ridge of the plurality of ridges of the second inner gasket angled in cross-section with respect to a radial direction of the second inner gasket towards a first axial end of the second inner gasket when the second inner gasket is in an uncompressed state, the radially outer surface of the second inner gasket contacting the radially inner surface of the second outer gasket; and
   removing the second inner gasket from the second seal.

10. A seal for a pipe coupling, the seal comprising:
    an outer gasket defining a radially inner surface, the radially inner surface defining a plurality of grooves; and an inner gasket separably joined to the outer gasket, the inner gasket defining a radially outer surface, the radially outer surface defining a plurality of ridges, each of the plurality of ridges extending radially outward relative to an axis of the inner gasket, the plurality of ridges comprising:
- a first ridge, each of a first side surface and a second side surface of the first ridge angled in cross-section with respect to a radial direction of the inner gasket towards a first axial end of the inner gasket when the inner gasket is in an uncompressed state; and
- a second ridge, each of a first side surface and a second side surface of the second ridge angled in cross-section with respect to the radial direction of the inner gasket towards a second axial end of the inner gasket when the inner gasket is in the uncompressed state;

wherein the radially outer surface of the inner gasket contacts the radially inner surface of the outer gasket.

11. The seal of claim 10, wherein a radially inner surface of the inner gasket defines a conical shape.

12. The seal of claim 11, wherein the radially inner surface of the inner gasket defines a first conical portion and a second conical portion, a taper angle of the first conical portion being greater than a taper angle of the second conical portion, each of the first conical portion and the second conical portion being angled with respect to the axis of the inner gasket when the inner gasket is in the uncompressed state.

13. The seal of claim 10, wherein the plurality of ridges of the inner gasket further comprises a third ridge.

14. The seal of claim 13, wherein each of a first side surface and a second side surface of the third ridge is angled in cross-section with respect to the radial direction of the inner gasket towards a one of the first axial end and the second axial end of the inner gasket when the inner gasket is in the uncompressed state.

15. The seal of claim 10, wherein a one of the outer gasket and the inner gasket of the seal has a material hardness of less than or equal to about 75 on the Shore A scale.

16. A pipe coupling comprising:
- a coupling body defining a first body end and a second body end, a coupling bore defined in and extending through the coupling body from the first body end to the second body end;
- a first end ring attached to the first body end, the first end ring comprising a first seal and a first split ring, the first seal disposed within the first split ring, the first split ring defining a first ring end and a second ring end, the first split ring configured to compress the first seal radially inward in a tensioned state;
- a second end ring attached to the second body end, the second end ring comprising a second seal and a second split ring, the second seal disposed within the second split ring, the second split ring defining a first ring end and a second ring end, the second split ring configured to compress the second seal radially inward in a tensioned state; and
- a bar linkage comprising:
  - a first bar configured to be oriented parallel to an axis of the pipe coupling, at least when the pipe coupling couples pipes of equal diameter, and span two end rings thereof;
  - a second bar configured to be oriented parallel to the axis of the pipe coupling, at least when the pipe coupling couples pipes of equal diameter, and span the two end rings thereof; and
  - a tensioner joining the first bar to the second bar in an assembled condition of the bar linkage and configured to draw the first bar towards the second bar, the first bar and the second bar able to be angled with respect to each other and with respect to the axis of the pipe couple in a tightened condition of the pipe coupling, at least when the pipe coupling couples pipes of unequal diameter; each of the first bar and the second bar intersecting an axis of the tensioner, the bar linkage installable in and removable from the pipe coupling in the assembled condition; and wherein the bar linkage is engaged with the first end ring and the second end ring, the first bar extending between the first ring end of the first end ring and the first ring end of the second end ring and the second bar extending between the second ring end of the first end ring and the second ring end of the second end ring.

17. The pipe of claim 16, wherein each end of each of the first bar and the second bar defines a cutout in a radially inward facing surface of the respective each of the first bar and the second bar, the cutout configured to receive at least a portion of an end ring of the pipe coupling.

18. A method of using the pipe coupling of claim 16, further comprising:
- tightening the tensioner of the bar linkage;
- drawing the first bar and the second bar together in a tensioning direction;
- engaging the first end ring and the second end ring with each of the first bar and the second bar; and
- balancing a tension generated by the tensioner between the first end ring and the second end ring.

19. The method of claim 18, further comprising compressing each of the first seal of the first end ring and the second seal of the second end ring equally when the pipe coupling is in an engaged position with each of two pipe elements, the first end ring engaged with a first pipe element of the two pipe elements and the second end ring engaged with a second pipe element of the two pipe elements.

20. The pipe of claim 16, wherein each of the first bar and the second bar is configured to contact the pipe coupling at only the end rings thereof.

21. The pipe of claim 20, wherein the first bar and the second bar define a space and a distance therebetween, the space configured to not be occupied by any portion of the pipe coupling in a tightened condition of the pipe coupling except proximate to the end rings thereof.

22. A pipe coupling comprising:
- a coupling body defining a first body end and a second body end, a coupling bore defined in and extending through the coupling body from the first body end to the second body end;
- a first end ring attached to the first body end, the first end ring comprising a first seal and a first split ring, the first seal disposed within the first split ring, the first split ring defining a first ring end and a second ring end, the first split ring configured to compress the first seal radially inward in a tensioned state;
- a second end ring attached to the second body end, the second end ring comprising a second seal and a second split ring, the second seal disposed within the second split ring, the second split ring defining a first ring end and a second ring end, the second split ring configured to compress the second seal radially inward in a tensioned state; and
- a bar linkage comprising:
  - a first bar configured to be oriented parallel to an axis of the pipe coupling and span two end rings thereof;

a second bar configured to be oriented parallel to the axis of the pipe coupling and span the two end rings thereof; and a tensioner joining the first bar to the second bar and configured to draw the first bar towards the second bar; each of the first bar and the second bar intersecting an axis of the tensioner;

wherein the bar linkage is engaged with the first end ring and the second end ring, the first bar extending between the first ring end of the first end ring and the first ring end of the second end ring and the second bar extending between the second ring end of the first end ring and the second ring end of the second end ring.

23. The bar linkage of claim 22, wherein each end of each of the first bar and the second bar defines a cutout in a radially inward facing surface of the respective each of the first bar and the second bar, the cutout configured to receive at least a portion of an end ring of the pipe coupling.

24. A method of using the pipe coupling of claim 22, further comprising:

tightening the tensioner of the bar linkage;

drawing the first bar and the second bar together in a tensioning direction;

engaging the first end ring and the second end ring with each of the first bar and the second bar; and balancing a tension generated by the tensioner between the first end ring and the second end ring.

25. The method of claim 24, further comprising compressing each of the first seal of the first end ring and the second seal of the second end ring equally when the pipe coupling is in an engaged position with each of two pipe elements, the first end ring engaged with a first pipe element of the two pipe elements and the second end ring engaged with a second pipe element of the two pipe elements.

\* \* \* \* \*